United States Patent
Grundhoefer

(10) Patent No.: US 12,222,506 B1
(45) Date of Patent: Feb. 11, 2025

(54) DIMMING OF OPTICAL PASSTHROUGH DISPLAYS

(71) Applicant: Apple Inc., Cupertino, CA (US)

(72) Inventor: Anselm Grundhoefer, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 143 days.

(21) Appl. No.: 17/750,214

(22) Filed: May 20, 2022

Related U.S. Application Data

(63) Continuation of application No. 16/851,582, filed on Apr. 17, 2020, now Pat. No. 11,366,321.

(60) Provisional application No. 62/837,531, filed on Apr. 23, 2019.

(51) Int. Cl.
| | |
|---|---|
| G06F 3/01 | (2006.01) |
| G02B 27/01 | (2006.01) |
| G06F 3/0481 | (2022.01) |
| G09G 5/10 | (2006.01) |

(52) U.S. Cl.
CPC .......... G02B 27/0172 (2013.01); G09G 5/10 (2013.01); *G02B 2027/0118* (2013.01); *G02B 2027/0138* (2013.01); *G09G 2360/141* (2013.01); *G09G 2360/144* (2013.01)

(58) Field of Classification Search
CPC ........ G02B 27/0172; G02B 2027/0118; G02B 2027/0138; G09G 5/10; G09G 2360/141; G09G 2360/144
See application file for complete search history.

(56) References Cited

U.S. PATENT DOCUMENTS

| | | |
|---|---|---|
| 6,243,002 B1 | 6/2001 | Hill et al. |
| 9,129,295 B2 | 9/2015 | Border et al. |
| 9,626,936 B2 | 4/2017 | Bell |
| 9,652,047 B2 | 5/2017 | Mullins et al. |
| 9,699,436 B2 | 7/2017 | Fullam |
| 9,746,739 B2 | 8/2017 | Alton et al. |
| 9,977,960 B2 | 5/2018 | Gustafsson et al. |
| 10,085,683 B1* | 10/2018 | Sham ............... G08B 21/06 |
| 2007/0273611 A1* | 11/2007 | Torch ............... A61B 3/112 345/8 |
| 2008/0074872 A1 | 3/2008 | Panotopoulos |
| 2012/0252495 A1 | 10/2012 | Moeglein et al. |
| 2015/0130911 A1 | 5/2015 | Ohashi |

(Continued)

FOREIGN PATENT DOCUMENTS

WO 2015/173044 A1 11/2015

*Primary Examiner* — Kwang-Su Yang
(74) *Attorney, Agent, or Firm* — Fernando & Partners, LLP

(57) ABSTRACT

In one implementation, a method of controlling a dimming level of dimmable optical element based on a predicted ambient light level is performed at a device including one or more processors, non-transitory memory, and a dimmable optical element. The method includes predicting a change, in a first direction, in an ambient light level at a future time. The method includes changing, at a first time in advance of the future time and in the first direction, a transmission coefficient of the dimmable optical element based on the predicted change in the ambient light level. The method includes changing, at a second time after the first time and in a second direction opposite the first direction, the transmission coefficient of the dimmable optical element based on the ambient light level at the second time.

20 Claims, 18 Drawing Sheets

(56) References Cited

U.S. PATENT DOCUMENTS

| | | | |
|---|---|---|---|
| 2015/0219897 A1* | 8/2015 | Mukawa | G02B 5/30 |
| | | | 345/8 |
| 2015/0323795 A1 | 11/2015 | Alton et al. | |
| 2016/0085301 A1 | 3/2016 | Lopez | |
| 2017/0188807 A1* | 7/2017 | Swital | G16H 40/63 |
| 2017/0315417 A1 | 11/2017 | Alton et al. | |
| 2018/0299953 A1* | 10/2018 | Selker | G06T 19/006 |
| 2020/0183190 A1* | 6/2020 | Rousseau | G02B 27/0101 |
| 2020/0211512 A1* | 7/2020 | Sztuk | G09G 5/38 |
| 2021/0132414 A1* | 5/2021 | Peloux | G02B 27/0093 |
| 2021/0144361 A1* | 5/2021 | Shanks | H04N 13/383 |

\* cited by examiner

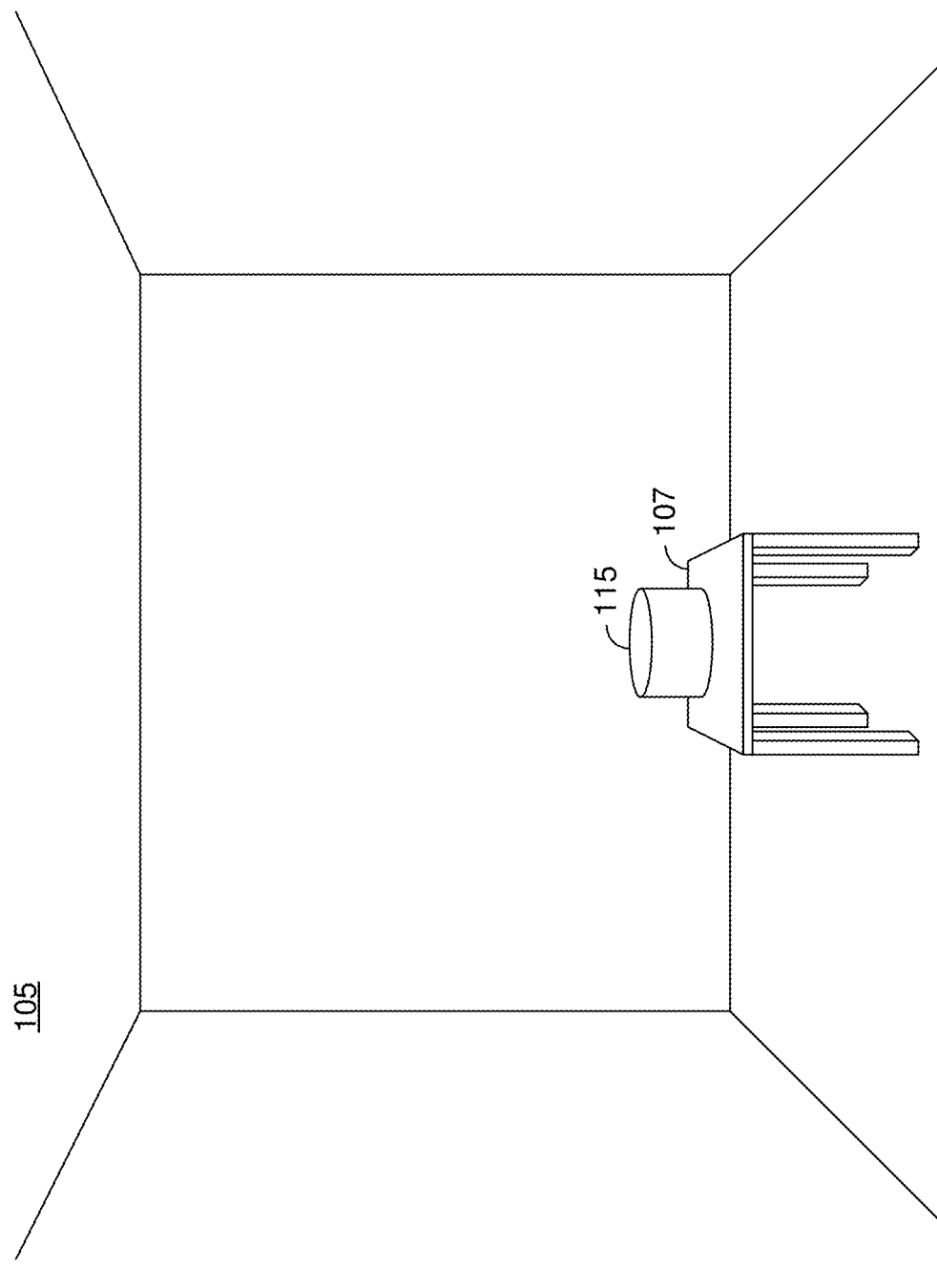

600

At a device including one or more processors, non-transitory memory, and a dimmable optical element:

Predicting a change, in a first direction, in ambient light level at a future time ⟵ 610

Changing, at a first time in advance of the future time and in the first direction, a transmission coefficient of the dimmable optical element based on the predicted change in the ambient light level ⟵ 620

Changing, at a second time after the first time and in a second direction opposite the first direction, the transmission coefficient of the dimmable optical element based on the ambient light level at the second time ⟵ 630

At a device including one or more processors, non-transitory memory, an eye tracking camera, and a dimmable optical element:

Capturing an image of an eye of a user — 810

Determining, based on the image of the eye of the user, an eye measurement of the user — 820

Changing the transmission coefficient of the dimmable optical element based on the eye measurement of the user — 830

Figure 8

DIMMING OF OPTICAL PASSTHROUGH DISPLAYS

CROSS-REFERENCE TO RELATED APPLICATIONS

This application is a continuation of U.S. patent application Ser. No. 16/851,582, filed on Apr. 17, 2020, which claims priority to U.S. Provisional Patent App. No. 62/837,531, filed on Apr. 23, 2019, which are both hereby incorporated by reference in their entirety.

TECHNICAL FIELD

The present disclosure generally relates to optical passthrough displays and, in particular, to systems, methods, and devices for dimming optical passthrough displays.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a head-mounted device (HMD) can include an optical passthrough display. In various implementations, the optical passthrough display includes a globally dimmable layer that, according to a controllable dimming level, dims light passing through the optical passthrough display. By controlling the dimming level, the HMD can be operated as "smart sunglasses" that automatically dim according to ambient light levels. However, in various implementations, the dimming level is controlled based on other considerations, such as a predicted ambient light level at a future time (e.g., when approaching a tunnel or heading outdoors) or an eye measurement (e.g., a gaze direction or pupil dilation).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1B is a perspective view of a CGR environment in accordance with some implementations.

FIG. 6 is a flowchart representation of a method of controlling a dimming level of a dimmable optical element based on a predicted change in ambient light level in accordance with some implementations.

FIG. 8 is a flowchart representation of a method of controlling a dimming level of a dimmable optical element based on an eye measurement in accordance with some implementations.

Figure 1A:
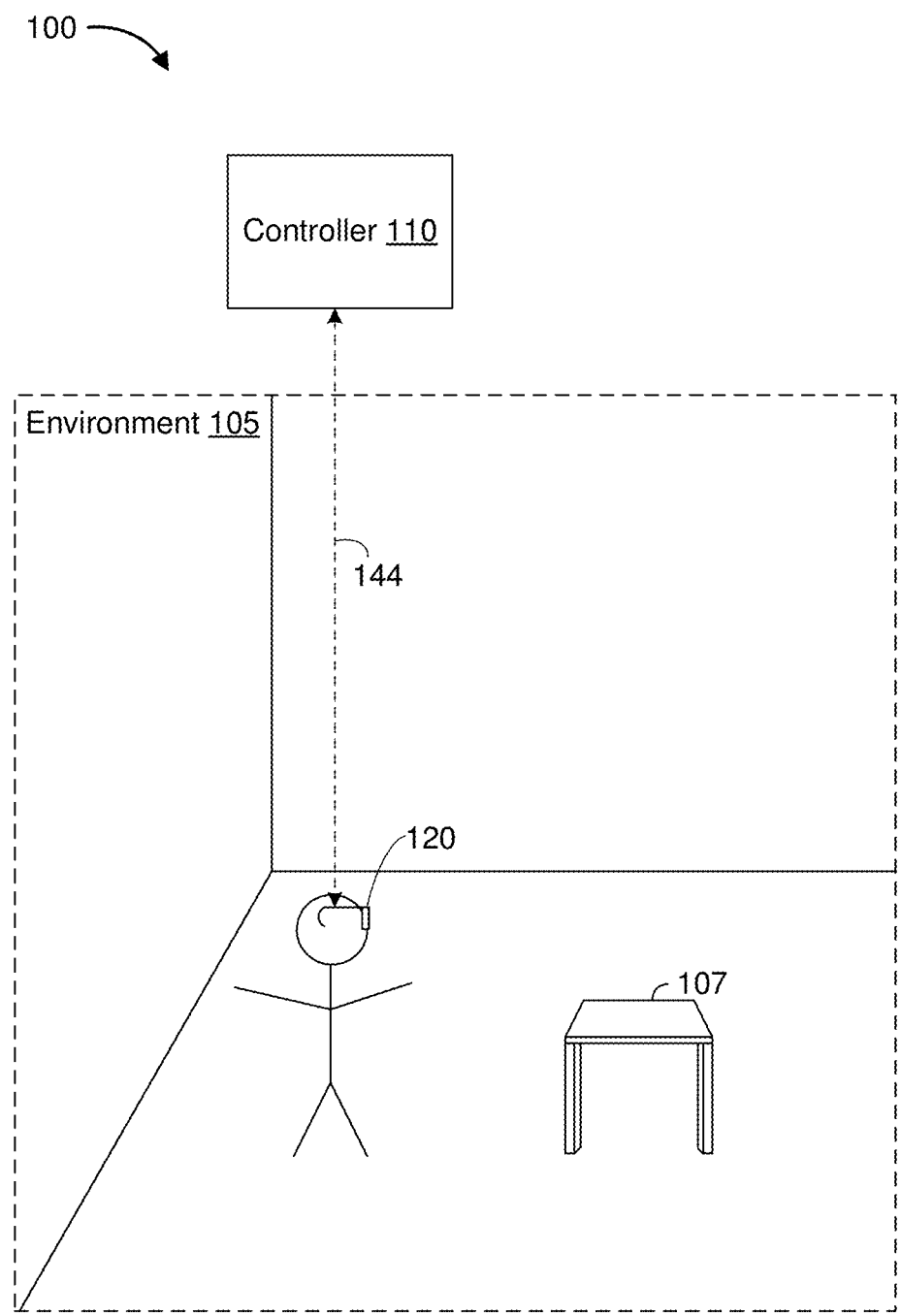
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for controlling a dimming level of a dimmable optical element. In various implementations, a method is performed at a device including one or more processors, non-transitory memory, and a dimmable optical element. The method includes predicting a change, in a first direction, in an ambient light level at a future time. The method includes changing, at a first time in advance of the future time and in the first direction, a transmission coefficient of the dimmable optical element based on the predicted change in the ambient light level. The method includes changing, at a second time after the first time and in a second direction opposite the first direction, the transmission coefficient of the dimmable optical element based on the ambient light level at the second time.

In various implementations, a method is performed at a device including one or more processors, non-transitory memory, an eye tracking camera, and a dimmable optical element. The method includes capturing, via the eye tracking camera, an image of an eye of the user. The method includes determining, based on the image of the eye of the user, an eye measurement of the user. The method includes changing a transmission coefficient of the dimmable optical element based on the eye measurement of the user.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Some HMDs can operate as "smart sunglasses" by controlling the dimming level of a globally dimmable layer of an optical passthrough display. For example, when a user is indoors (in low-light conditions), the dimming level is set to a low value allowing more light to pass through, but when the user is outdoors (in bright-light conditions), the dimming level is set to a high value allowing less light to pass through. However, controlling the dimming level based only on the current ambient light level may lead to undesirable results when the illumination conditions suddenly change. Accordingly, in various implementations, the dimming level of a dimmable optical element is based on a predicted ambient light level or an eye measurement of a user.

FIG. 1A is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes a controller 110 and a head-mounted device (HMD) 120 within a real environment 105 including a table 107.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the real environment 105. For example, the controller 110 is a local server located within the real environment 105. In another example, the controller 110 is a remote server located outside of the real environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120.

According to some implementations, the HMD 120 provides a CGR experience to the user while the user is virtually and/or physically present within the real environment 105. For example, FIG. 1B illustrates the real environment 105 from the perspective of the user in which the table 107 is visible with a virtual object 115 (displayed by the HMD 120) upon the table 107. In some implementations, the HMD 120 includes a suitable combination of software, firmware, and/or hardware. The HMD 120 is described in greater detail below with respect to FIG. 3A. In some implementations, the functionalities of the controller 110 are provided by and/or combined with the HMD 120.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the real environment 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
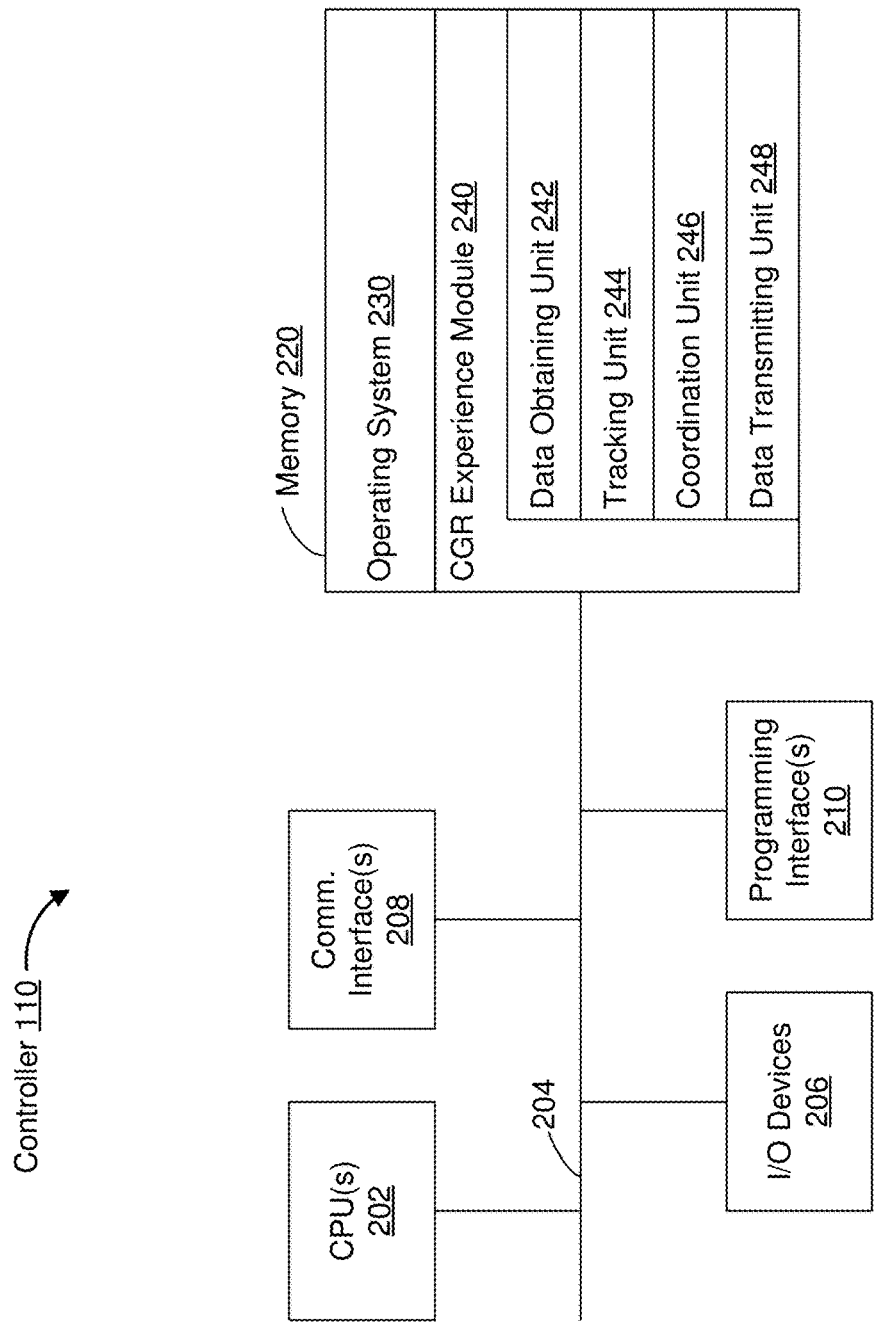
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), doubledata-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120 of FIG. 1A. To that end, in various implementations, the data obtaining unit 242 includes instructions and/or logic therefor, and heuristics and metadata therefor.

In some implementations, the tracking unit 244 is configured to map the scene (e.g., the real environment 105) and to track the position/location of at least the HMD 120 with respect to the scene (e.g., the real environment 105 of FIG. 1A). To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3A:
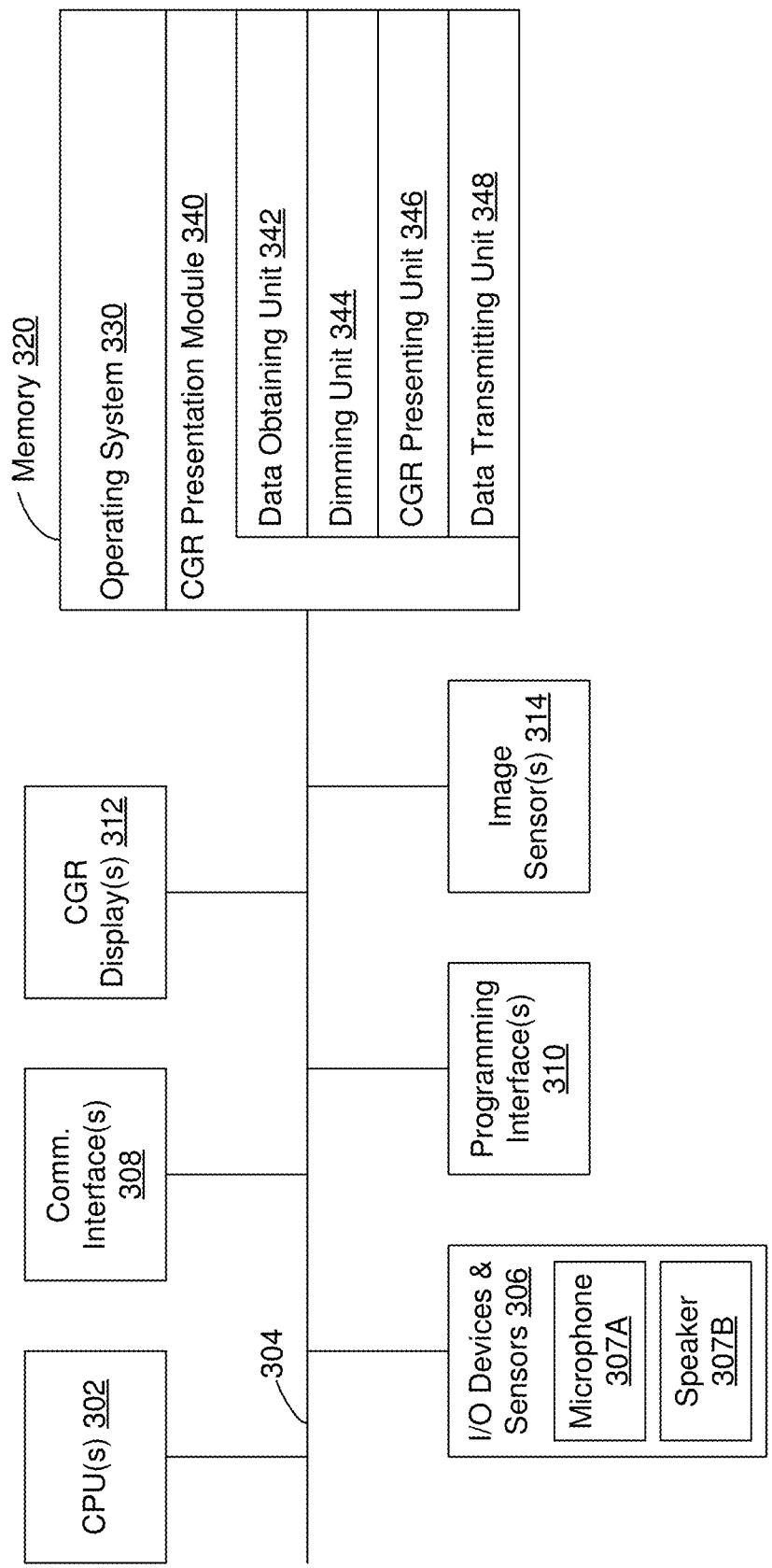
FIG. 3A is a block diagram of an example head-mounted device (HMD) in accordance with some implementations.

FIG. 3A is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting MR and VR content.

Figure 3B:
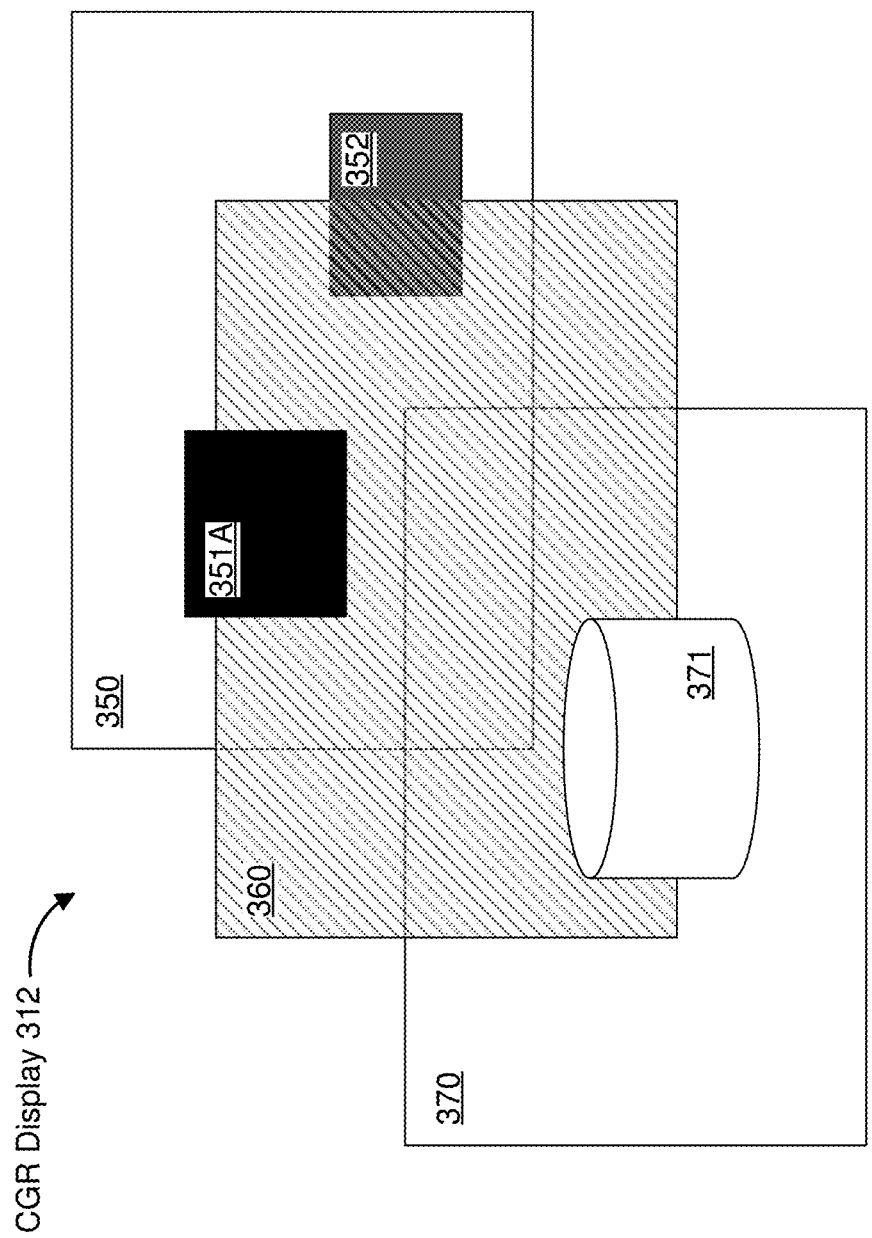
FIG. 3B is a blow-up view of an example CGR display in accordance with some implementations.

In various implementations, the one or more CGR displays 312 are video passthrough displays which display at least a portion of the real environment 105 as an image captured by a scene camera. In various implementations, the one or more CGR displays 312 are optical passthrough displays which are at least partially transparent and pass light emitted by or reflected off the real environment 105. FIG. 3B illustrates a blow-up view of an optical passthrough CGR display 312 in accordance with some implementations. In various implementations, the CGR display 312 includes a selectively occlusive layer 350 that includes a number of pixel elements that, when activated, block light from passing through the optical passthrough display 312. Thus, through appropriate addressing of the selectively occlusive layer 350, the CGR display can render a black region 351A or a gray region 352. In various implementations, the CGR display 312 includes a globally dimmable layer 360 that, according to a controllable dimming level, dims light passing through the optical passthrough display 312. In various implementations, the globally dimmable layer 360 includes one or more of a photochromic element, electrochromic element, an SPD (suspended-particle device) element, GHLC (guest-host liquid crystal) element, or PDLC (polymer-dispersed liquid-crystal) element. In various implementations, the CGR display 312 includes a light addition layer 370 that includes a number of pixel elements that, when activated, emit light towards the user. Thus, through appropriate addressing of the light addition layer 370, the CGR display 312 can render a white (or colored) virtual object 371. In various implementations, the CGR display 312 does not include each of the layers 350, 360, 370. In particular, in various implementations, the CGR display 312 does not include the selectively occlusive layer 350 and/or the globally dimmable layer 360. In various implementations, the CGR display 312 does not include the light addition layer 370 and/or the globally dimmable layer 360. In various implementations, the CGR display 312 does not include the selectively occlusive layer 350 and/or the light addition layer 370.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a dimming unit 344, a CGR presentation unit 346, and a data transmitting unit 348.

In some implementations, the data obtaining unit 342 is configured to obtain data (e.g., presentation data, interaction data, sensor data, location data, etc.) from at least the controller 110 of FIG. 1A. To that end, in various implementations, the data obtaining unit 342 includes instructions and/or logic therefor, and heuristics and metadata therefor.

In some implementations, the dimming unit 344 is configured to globally or locally dim at least a portion of the CGR display 312. In various implementations, the dimming is based on a predicted change in ambient light level and/or an eye measurement of the user of the HMD 120. To that end, in various implementations, the dimming unit 344 includes instructions and/or logic therefor, and heuristics and metadata therefor.

In some implementations, the CGR presenting unit 346 is configured to present CGR content via the one or more CGR displays 312. To that end, in various implementations, the CGR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the dimming unit 344, the CGR presenting unit 346, and the data transmitting unit 348 are shown as residing on a single device (e.g., the HMD 120 of FIG. 1A), it should be understood that in other implementations, any combination of the data obtaining unit 342, the dimming unit 344, the CGR presenting unit 346, and the data transmitting unit 348 may be located in separate computing devices.

Moreover, FIG. 3A is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

By controlling the dimming level of the globally dimmable layer 360 of the CGR display 312, the HMD 120 can operate as "smart sunglasses" that automatically dim according to ambient light levels. For example, when a user is indoors (in low-light conditions), the dimming level is set to a low value allowing more light to pass through the CGR display 312, but when the user is outdoors (in bright-light conditions), the dimming level is set to a high value allowing less light to pass through the CGR display 312.

In various circumstances, controlling the dimming level based only on the current ambient light level leads to undesirable results. For example, adjustment based on current ambient light levels may lead to abrupt and/or unnatural changes in the amount of light passing through CGR display 312, thereby disorienting the user. As another example, a delay or other error in detecting that ambient light levels have decreased, e.g., when the user enters a tunnel, may result in an undesirable period in which the HMD 120 remains dimmed in low-light conditions, thereby hindering the user's sight. As another example, in bright-light conditions, dimming the globally dimmable layer 360 may hinder viewing of particular dark objects (e.g., reading a navy-blue greeting card).

Figure 4A:
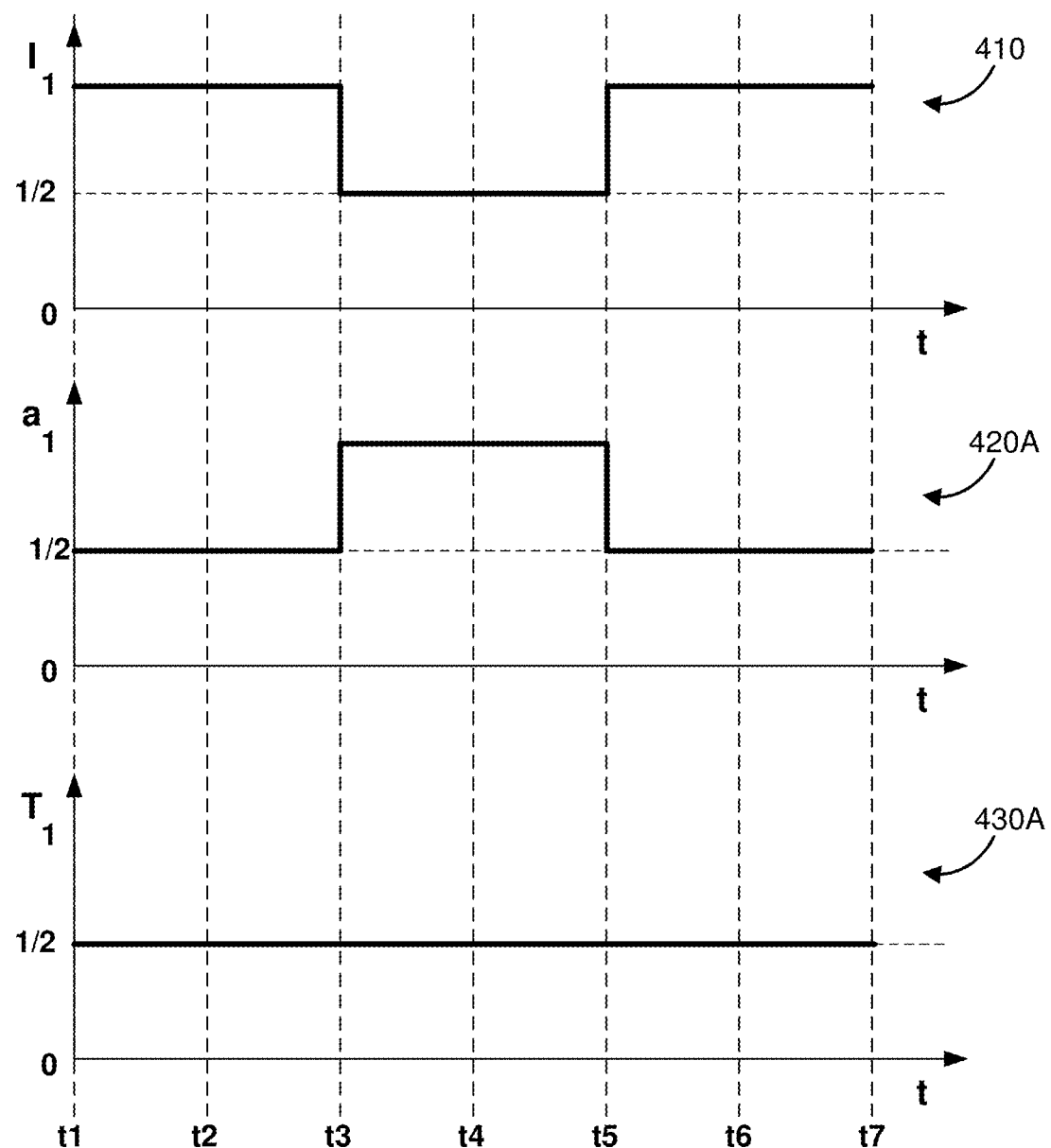
FIGS. 4A-4D illustrate graphs of ambient light level, transmission coefficient, and transmitted light levels in various implementations of controlling a dimming level of a dimmable optical element through changes in ambient light level of a first degree.

FIG. 4A illustrates graphs of an ambient light level, a transmission coefficient, and a transmitted light level in a first implementation of controlling a dimming level of a dimmable optical element through changes in ambient light level of a first degree. FIG. 4A illustrates a first graph 410 of the ambient light level (I) versus time (t) in accordance with various implementations. The ambient light level is at a first value (1) from a first time (t1), through a second time (t2), to a third time (t3). At the third time, the ambient light level drops from the first value to a second value (½) lower than the first value. The ambient light level remains at the second value from the third time, through a fourth time (t4), until a fifth time (t5). At the fifth time, the ambient light level increases back to the first value (1), where it remains through a sixth time (t6) to a seventh time (t7).

For example, in various implementations, the first graph 410 represents the ambient light level as a user wearing a device including the dimmable optical element drives through a tunnel. As another example, in various implementations, the first graph 410 represents the ambient light level as a user wearing a device including the dimmable optical element, while walking in an urban environment, turns a corner into the shadow of a tall building and turns another corner exiting the shadow. As another example, in various implementations, the first graph 410 represents the ambient light level as a user wearing a device including the dimmable optical element enters (and then exits) a restaurant.

FIG. 4A further illustrates a second graph 420A of the transmission coefficient (α) versus time in accordance with various implementations. In various implementations, the transmission coefficient is related (or inversely related) to the controllable dimming level of the dimmable optical element. In various implementations, the transmission coefficient is proportional (or inversely proportional) to the controllable dimming level of the dimmable optical element. While the transmission coefficient generally ranges between 0 and 1, the dimming level can take any of a set of values mappable to the transmission coefficient. For example, in various implementations, the controllable dimming level is a whole number between 0 and 63 which maps to values of the transmission coefficient between 1 and 0.

In FIG. 4A, the transmission coefficient is inversely related to the ambient light level. Thus, when the ambient light level is greater (e.g., the first value), the transmission coefficient is a first value (½) and when the ambient light level is less (e.g., the second value), the transmission coefficient is a second value (1) greater than first value. Accordingly, the transmission coefficient is the first value between the first time and the third time, the second value between the third time and the fifth time, and the first value between the fifth time and the seventh time.

FIG. 4A further illustrates a third graph 430 of the transmitted light level (T) versus time. The transmitted light level is generally equal to the ambient light level multiplied by the transmission coefficient. However, in various implementations, the transmitted light level is also lessened by absorption by the dimmable optical element or otherwise affected by the angle of incident light. Thus, in FIG. 4A, the transmitted light level is a constant value (½) from the first time to the seventh time. In various implementations, the constant value reflects user preferences regarding transmitted light levels.

Accordingly, FIG. 4A illustrates an implementation in which the dimming level of the dimmable optical element is controlled to achieve a constant transmitted light level while the ambient light level changes. Such an implementation may be advantageous in reducing eye strain of the user caused by adjusting to different transmitted light levels. Such an implementation may also be advantageous in avoiding transmitted light levels above a certain threshold (e.g., inducing light sensitivity or photophobia) or below a certain threshold (e.g. reducing visibility). However, such an implementation may be disadvantageous as a user may be disconcerted or disoriented by an unnatural lack of change in transmitted light levels when such change is expected based on a change in ambient light levels.

Figure 4B:
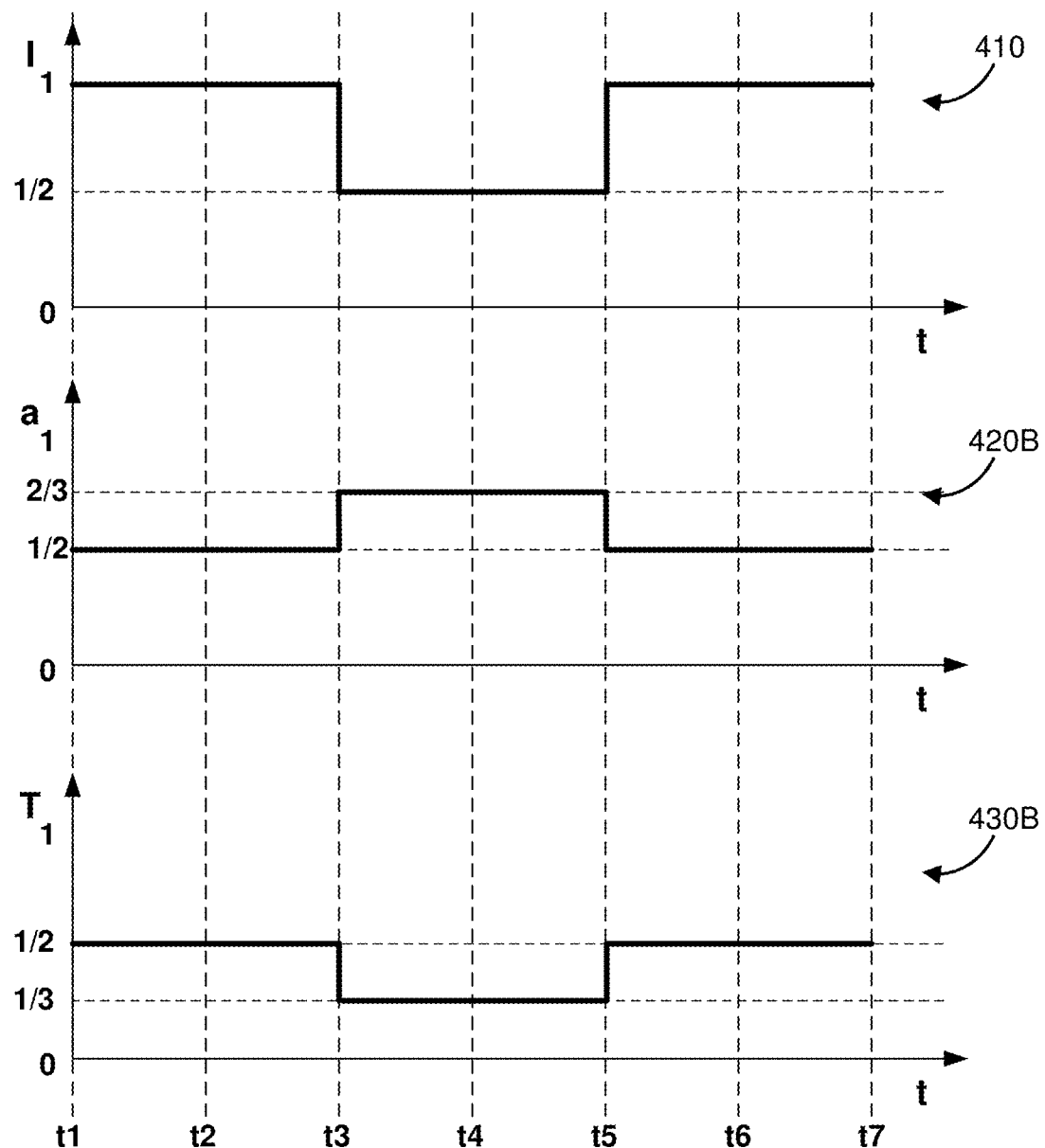

FIG. 4B illustrates graphs of an ambient light level, a transmission coefficient, and a transmitted light level in a second implementation of controlling a dimming level of a dimmable optical element through changes in ambient light level of a first degree. FIG. 4B illustrates the same first graph 410 of the ambient light level (I) versus time (t) as in FIG. 4A.

FIG. 4B further illustrates a second graph 420B of the transmission coefficient (α) versus time in accordance with various implementations. In FIG. 4B, as in FIG. 4A, the transmission coefficient is inversely related to the ambient light level. Accordingly, the transmission coefficient is a first value (½) between the first time and the third time, a second value (⅔) between the third time and the fifth time, and the first value between the fifth time and the seventh time. Notably, the second value (⅔) between the third time and the fifth time in FIG. 4B is less than the second value (1) between the third time and the fifth time in FIG. 4A.

FIG. 4B further illustrates a third graph 430B of the transmitted light level (T) versus time. Thus, in FIG. 4B, the transmitted light level is a first value (½) from the first time to the third time, a second value (⅓) from the third time to fifth time, and the first value from the fifth time to the seventh time. Notably, the second value (⅓) from the third time to the fifth time is less than the constant value (½) between the third time and the fifth time in FIG. 4A.

Accordingly, FIG. 4B illustrates an implementation in which the dimming level of the dimmable optical element is controlled to reduce (but not eliminate) the effect of changes in ambient light levels. Such an implementation may be advantageous in reducing eye strain of the user caused by adjusting to different transmitted light levels while maintaining the transmitted light levels between a minimum threshold and a maximum threshold and still providing a visual cue that changes in ambient light levels have occurred.

Thus, in various implementations, the dimming level of the dimmable optical element is controlled to provide feedback that ambient light levels have changed even when the dimmable optical element could be controlled to achieve a constant transmitted level as in FIG. 4A. Thus, in various implementations, the dimming level of the dimmable optical element is controlled such that the change in transmitted light level is non-zero, but less than the change in ambient light level (and/or less than the change in transmitted light level that would occur without adjustment of the dimming level).

Figure 4C:
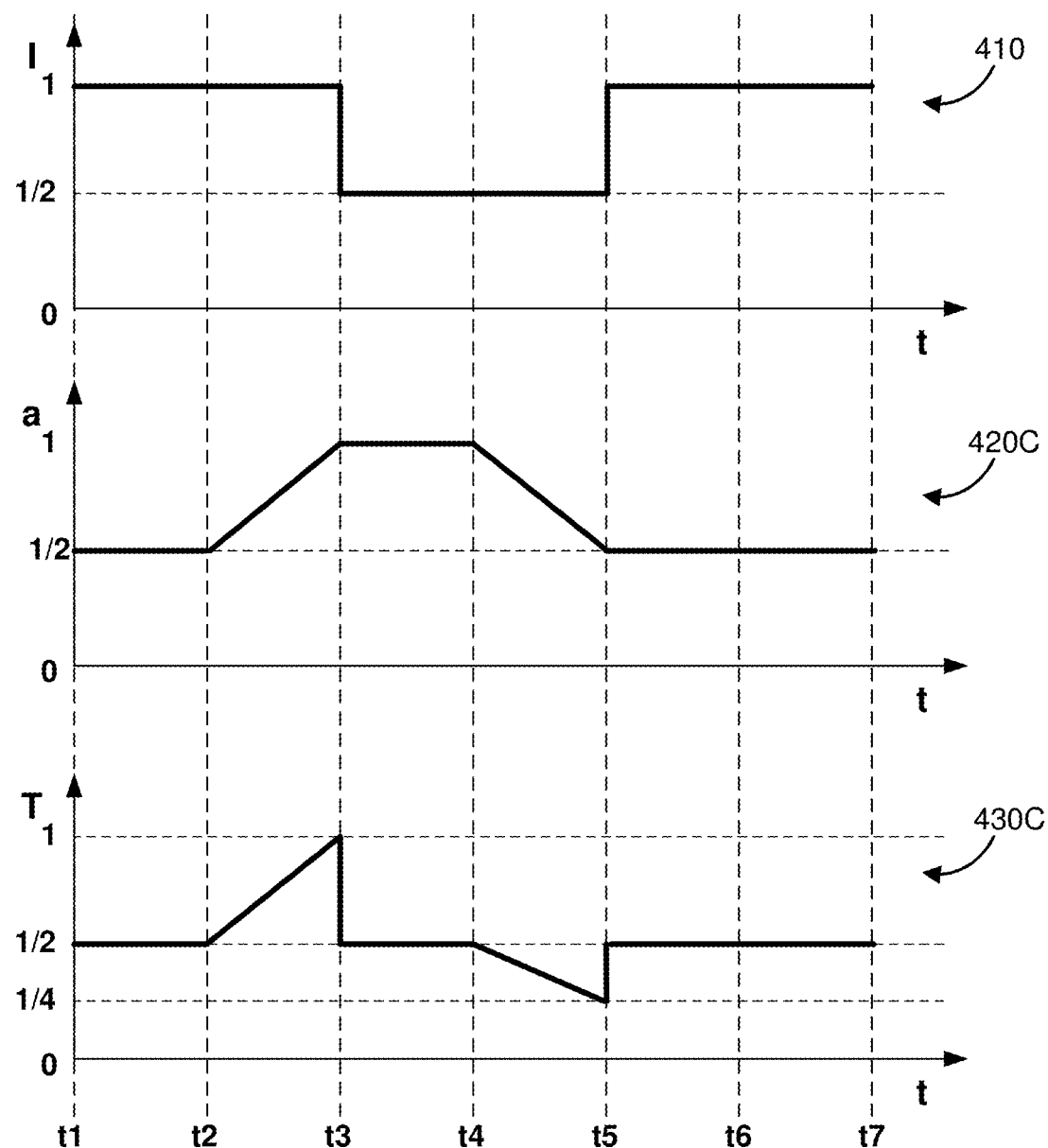

FIG. 4C illustrates graphs of an ambient light level, a transmission coefficient, and a transmitted light level in a third implementation of controlling a dimming level of a dimmable optical element through changes in ambient light level of a first degree. FIG. 4C illustrates the same first graph 410 of the ambient light level (I) versus time (t) as in FIG. 4A.

FIG. 4C further illustrates a second graph 420C of the transmission coefficient (a) versus time in accordance with various implementations. In FIG. 4C, the transmission coefficient is based on the current ambient light level and a prediction of the ambient light level at a future time. Between the first time and the second time, the transmission coefficient is a first value (½). At (or before) the second time, a prediction is made regarding the ambient light level at the third time. In various implementations, the prediction is based on a current (and/or predicted) location, such as when a user of a device including the dimmable optical element is approaching a tunnel, the entrance to a building, or a street corner. In various implementations, the prediction is based on an estimate of motion and/or behavioral patterns of a user of a device including the dimmable optical element. In various implementations, the prediction is based on one or more scene camera images, such as when the scene camera images show that a user is reaching for a doorknob or approaching a shadow. In various implementations, the prediction is based on an ambient light sensor, such as when ambient light levels indicate that the sun is setting. In various implementations, the prediction is based on learned behavior, such as learning that office blinds automatically close at 5:00 pm everyday. In various implementations, the prediction is based on calendar events generated by a user, such as calendar event indicating a meeting at a local restaurant. In various implementation, the prediction is based on cloud data retrieved over a network, such a data indicating that streetlights turn on at civil twilight or that a solar eclipse is about to occur Based on a prediction that the ambient light level will decrease at the third time and, therefore, the transmission coefficient at the third time will be a second value (e.g., 1 as in FIG. 4A and illustrated in FIG. 4C or, in various implementations, ⅔ as in FIG. 4B), the transmission coefficient is increased between the second time and the third time from the first value to the second value. Thus, at the third time, the transmission coefficient is the second value.

Similarly, at (or before) the fourth time, a prediction is made regarding the ambient light level at the fifth time. Based on a prediction that the ambient light level will increase at the fifth time, and, therefore, the transmission coefficient at the fifth time will be the first value (½), the transmission coefficient is decreased between the fourth time and the fifth time from the second value to the first value. Thus, at the fifth time, the transmission coefficient is the first value.

FIG. 4C further illustrates a third graph 430C of the transmitted light level (T) versus time. In FIG. 4C, the transmitted light level is a first value (½) from the first time to the second time and increases between the second time and the third time to a second value (1). At the third time, as a result of the ambient light level dropping, the transmitted light level drops from the second value to the first value. From the third time to the fourth time, the transmitted light level stays at the first value. From the fourth time to the fifth time, the transmitted light level decreases to a third value (¼). At the fifth time, as a result of the ambient light level increasing, the transmitting light level increases to the first value, where it remains until the seventh time.

Accordingly, FIG. 4C illustrates an implementation in which abrupt changes in ambient light level are perceived as abrupt changes in transmitted light level providing strong visual cues that the ambient light level has changed. Nevertheless, the abrupt changes in transmitted light level are to a base level consistent with user preferences.

Figure 4D:
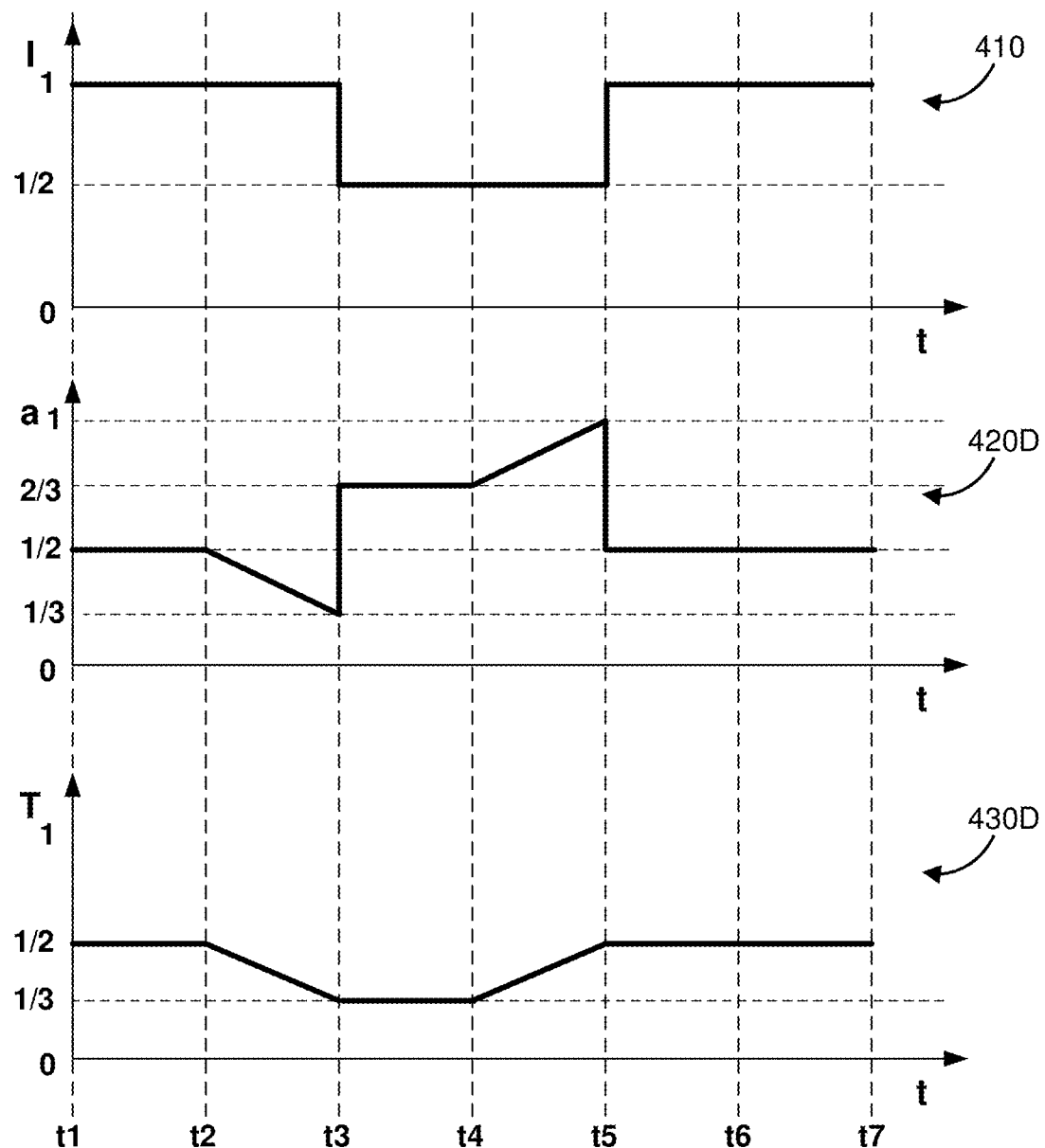

FIG. 4D illustrates graphs of an ambient light level, a transmission coefficient, and a transmitted light level in a fourth implementation of controlling a dimming level of a dimmable optical element through changes in ambient light level of a first degree. FIG. 4D illustrates the same first graph 410 of the ambient light level (I) versus time (t) as in FIG. 4A.

FIG. 4D further illustrates a second graph 420D of the transmission coefficient (a) versus time in accordance with various implementations. In FIG. 4D, the transmission coefficient is based on the current ambient light level and a prediction of the ambient light level at a future time. Between the first time and the second time, the transmission coefficient is a first value (½). At (or before) the second time, a prediction is made regarding the ambient light level at the third time. Based on the prediction that the ambient light level will decrease at the third time, the transmission coefficient is decreased between the second time and the third time from the first value (½) to a second value (⅓) less than the first value. At the third time, the transmission coefficient is increased to a third value (⅔). The transmission coefficient remains the third value between the third time and the fourth time.

At (or before) the fourth time, a prediction is made regarding the ambient light level at the fifth time. Based on the prediction that the ambient light level will increase at the fifth time, the transmission coefficient is increased between the fourth time and the fifth time from the second value to a fourth value (1) greater than the third value. At the fifth time, the transmission coefficient is decreased back to the first value.

FIG. 4D further illustrates a third graph 430D of the transmitted light level (T) versus time. In FIG. 4D, the transmitted light level is a first level (½) from the first time to the second time and decreases between the second time and the third time to a second level (⅓), lower than the first level. From the third time to the fourth time, the transmitted light level stays at the second level, then increases between the fourth time and fifth time to the first level, where it remains until the seventh time.

Thus, the change in transmitted light level caused by the change in ambient light level at the third time is spread out over the period between the second time and the third time and is not an abrupt change. Accordingly, between the second time and the third time, the user's eyes can adapt to the change in transmitted light level before it reaches is minimum. In other words, changing the transmission coefficient between the second time and the third time triggers dark adaptation of the user. Similarly, the change in transmitted light level caused by the change in ambient light level at the fifth time is spread out over the period between the fourth time and the fifth time and is not an abrupt change. Accordingly, between the fourth time and the fifth time, the user's eyes can adapt to the change in transmitted light levels before it reaches is maximum. In other words, changing the transmission coefficient between the fourth time and the fifth time triggers light adaptation of the user.

Figure 5A:
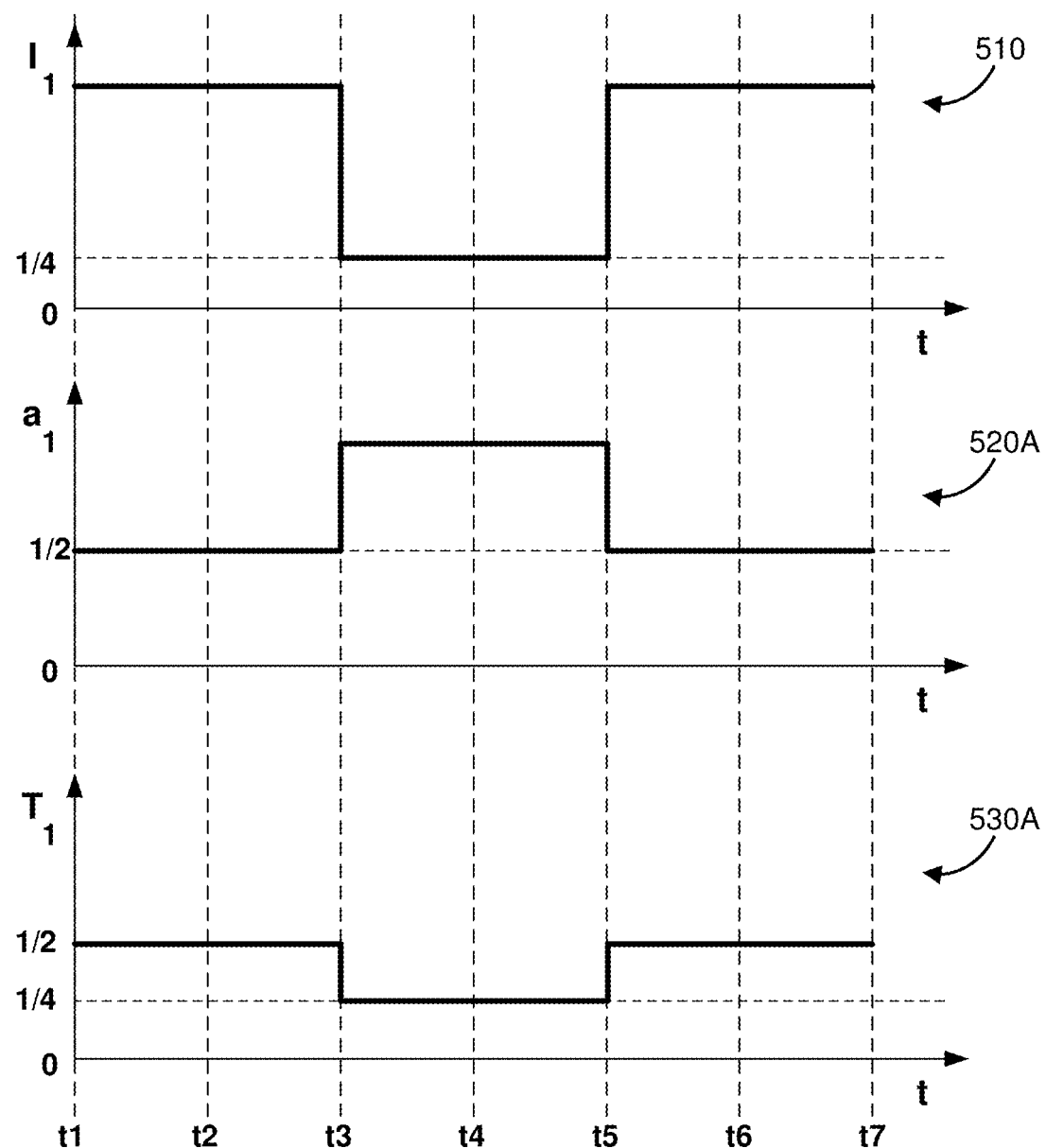
FIGS. 5A-5F illustrate graphs of ambient light level, transmission coefficient, and transmitted light levels in various implementations of controlling a dimming level of a dimmable optical element through changes in ambient light level of a second degree.

FIG. 5A illustrates graphs of an ambient light level, a transmission coefficient, and a transmitted light level in a first implementation of controlling a dimming level of a dimmable optical element through changes in ambient light level of a second degree (greater than the first degree). FIG. 5A illustrates a first graph 510 of the ambient light level (I) versus time (t) in accordance with various implementations. The ambient light level is at a first value (1) from a first time (t0), through a second time (t2), to a third time (t3). At the third time, the ambient light level drops from the first value to a second value (¼) lower than the first value (and lower than the second value (½) of FIGS. 4A-4D). The ambient light level remains at the second value from the third time, through a fourth time (t4), until a fifth time (t5). At the fifth time, the ambient light level increases back to the first value, where it remains through a sixth time (t6) and seventh time (t7).

For example, in various implementations, the first graph 510 represents the ambient light level as a user wearing a device including the dimmable optical element drives through a tunnel (e.g., a darker or longer tunnel than that of FIG. 4A-4D). As another example, in various implementations, the first graph 510 represents the ambient light level as a user wearing a device including the dimmable optical element, while walking in an urban environment, turns a corner into the shadow of a tall building and turns another corner exiting the shadow (e.g., at a different time than in FIG. 4A-4D when the sun is closer to horizon). As another example, in various implementations, the first graph 510 represents the ambient light level as a user wearing a device including the dimmable optical element enters (and then exits) a restaurant (e.g., a restaurant with a darker ambiance than that of FIG. 4A-4D).

FIG. 5A further illustrates a second graph 520A of the transmission coefficient (a) versus time in accordance with various implementations. In FIG. 5A, the transmission coefficient is inversely related to the ambient light level. Thus, when the ambient light level is greater (e.g., the first value), the transmission coefficient is a first value (½) and when the ambient light level is less (e.g., the second value), the transmission coefficient is a second value (1) greater than first value. Accordingly, the transmission coefficient is the first value between the first time and the third time, the second value between the third time and the fifth time, and the first value between the fifth time and the seventh time.

FIG. 5A further illustrates a third graph 530A of the transmitted light level (T) versus time. As noted above, the transmitted light level is generally equal to the ambient light level multiplied by the transmission coefficient. Accordingly, in FIG. 5A, the transmitted light level is a first value (½) from the first time to the third time, a second value (¼) lower than the first value (and lower than the second value (⅓) of FIGS. 4B and 4D), from the third time to the fifth time, and the first value from the fifth time to the seventh time.

In various implementations, the transmission coefficient cannot be raised higher than 1 (in which the dimmable optical element is completely transmissive and not at all dimmed). Thus, in various implementations, such as in FIG. 5A, the dimming level of the dimmable optical element cannot be controlled to achieve a constant transmitted light level as in FIG. 4A.

In various implementations, the transmission coefficient is artificially raised higher than 1 (referred to as "anti-dimming") by emitting light (e.g., white light) from a light addition layer of an optical passthrough display including the dimmable optical element. However, in various implementations, such an approach can undesirably reduce the contrast and/or saturation of the user's view. This may be particularly undesirable for prolonged periods.

Figure 5B:
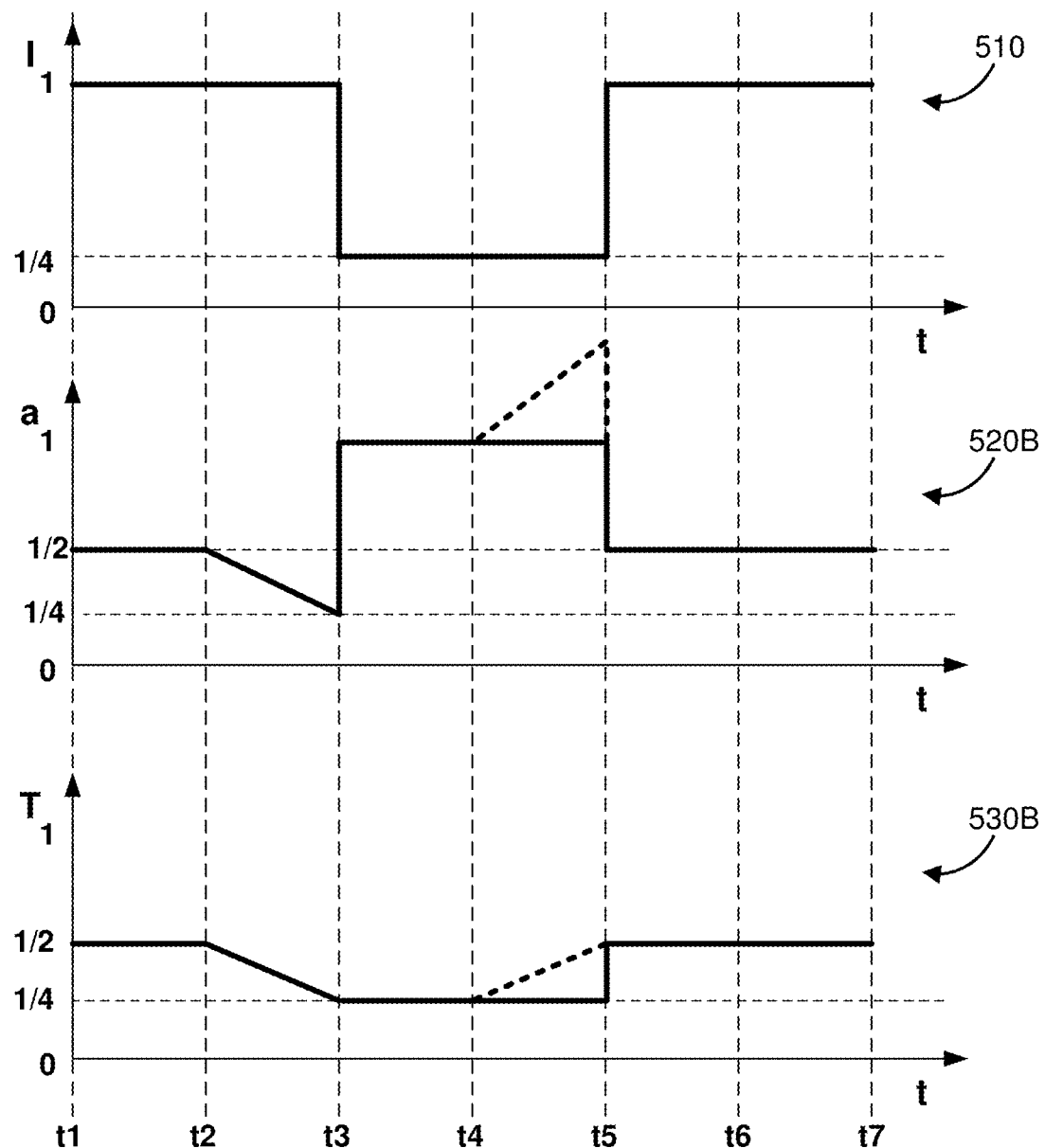

FIG. 5B illustrates graphs of an ambient light level, a transmission coefficient, and a transmitted light level in a second implementation of controlling a dimming level of a dimmable optical element through changes in ambient light level of a second degree. FIG. 5B illustrates the same first graph 510 of the ambient light level (I) versus time (t) as in FIG. 5A.

FIG. 5B further illustrates a second graph 520B of the transmission coefficient (a) versus time in accordance with various implementations. In FIG. 5B, the transmission coefficient is based on the current ambient light level and a prediction of the ambient light level at a future time. Between the first time and the second time, the transmission coefficient is the first value (½). At (or before) the second time, a prediction is made regarding the ambient light level at the third time. In various implementations, the prediction is based on a current (and/or predicted) location, such as when a user of a device including the dimmable optical element is approaching a tunnel, the entrance to a building, or a street corner. In various implementations, the prediction is based on an estimate of motion and/or behavioral patterns of a user of a device including the dimmable optical element. In various implementations, the prediction is based on one or more scene camera images, such as when the scene camera images show that a user is reaching for a doorknob or approaching a shadow. In various implementations, the prediction is based on an ambient light sensor, such as when ambient light levels indicate that the sun is setting. In various implementations, the prediction is based on learned behavior, such as learning that office blinds automatically close at 5:00 pm everyday. In various implementations, the prediction is based on cloud data retrieved over a network, such a data indicating that streetlights turn on at civil twilight or that a solar eclipse is about to occur.

Based on the prediction that the ambient light level will decrease at the third time, the transmission coefficient is decreased between the second time and the third time from the first value (½) to a second value (¼) less than the first value. At the third time, the transmission coefficient is increased to a third value (1).

In various implementations, the transmission coefficient is, as in FIG. 5A, the third value from the third time to the fifth time, when it decreases to the first value until the seventh time.

However, in various implementations (e.g., implementations with anti-dimming illustrated with a dashed line), at (or before) the fourth time, a prediction is made regarding the ambient light level at the fifth time. Based on the prediction that the ambient light level will increase at the fifth time, the transmission coefficient is artificially increased between the fourth time and the fifth time from the second value to a fourth value (2) greater than the third value. At the fifth time, the transmission coefficient is decreased to the first value.

FIG. 5B further illustrates a third graph 530B of the transmitted light level (T) versus time. In FIG. 5B, the transmitted light level is a first value (½) from the first time to the second time and decreases between the second time and the third time to a second value (¼) lower than the first level. From the third time to the fourth time, the transmitted light level stays at the second value, then (in implementations with anti-dimming illustrated with a dashed line) increases between the fourth time and fifth time to the first value, where it remains until the seventh time.

Thus, the change in transmitted light level caused by the change in ambient light level at the third time is spread out over the period between the second time and the third time and is not an abrupt change. Accordingly, between the second time and the third time, the user's eyes can adapt to the change in transmitted light level before it reaches is minimum. In other words, changing the transmission coefficient between the second time and the third time triggers dark adaptation of the user. This is particularly useful in circumstances when the ambient light levels are too low for a transmission coefficient of 1 or less to maintain transmitted light levels above a minimum.

Similarly, in implementations with anti-dimming, the change in transmitted light level caused by the change in ambient light level at the fifth time is spread out over the period between the fourth time and the fifth time and is not an abrupt change. Accordingly, between the fourth time and the fifth time, the user's eyes can adapt to the change in transmitted light levels between it reaches is maximum. In other words, changing the transmission coefficient between the fourth time and the fifth time triggers light adaptation of the user.

Figure 5C:
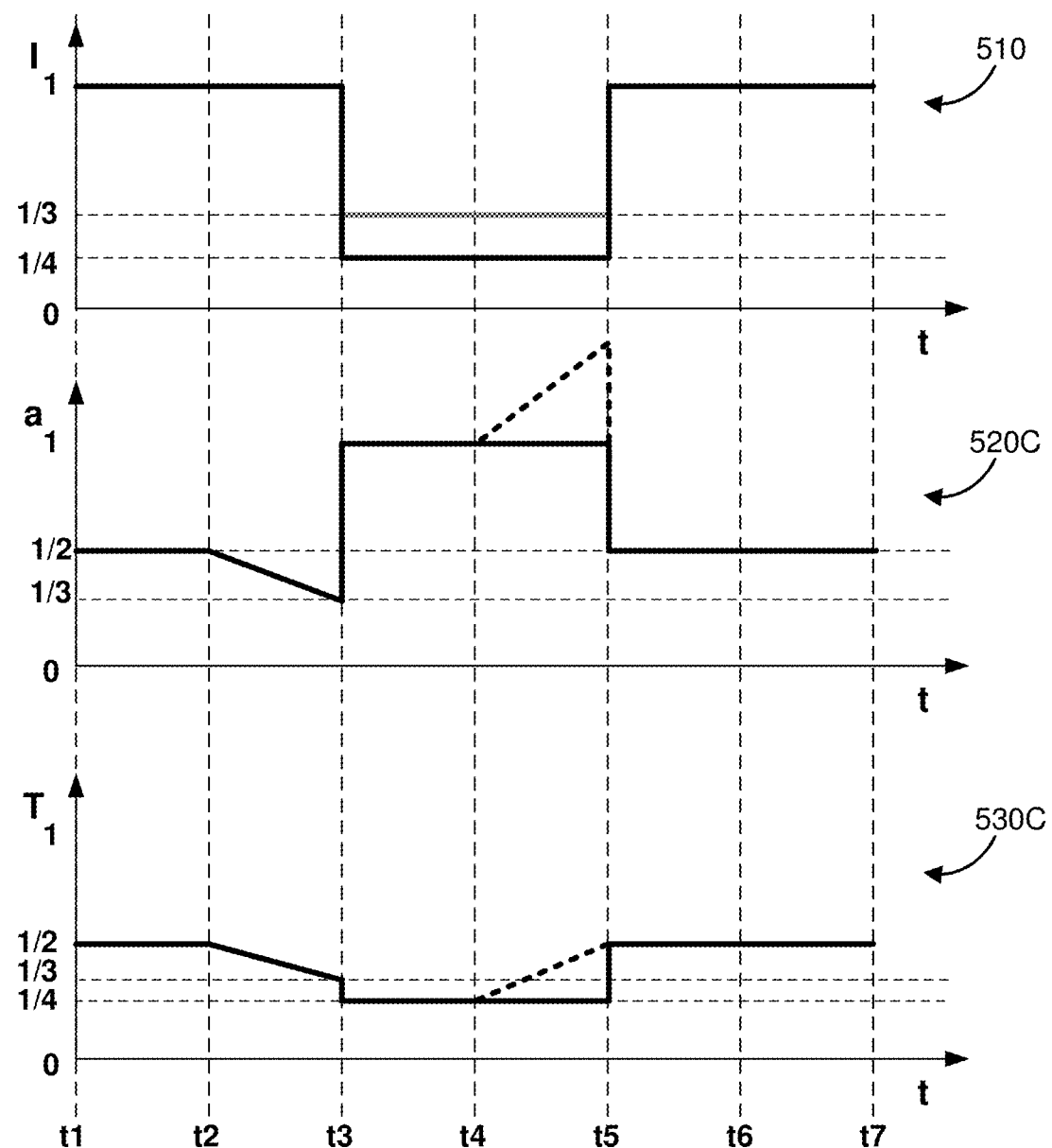

FIG. 5C illustrates graphs of an ambient light level, a transmission coefficient, and a transmitted light level in a third implementation of controlling a dimming level of a dimmable optical element through changes in ambient light level of a second degree. FIG. 5C illustrates the first graph 510 of the ambient light (I) versus time (t) of FIG. 5A.

FIG. 5C further illustrates a second graph 520C of the transmission coefficient (a) versus time in accordance with various implementations. In FIG. 5C, the transmission coefficient is based on the current ambient light level and an incorrect prediction of the ambient light level at a future time. Between the first time and the second time, the transmission coefficient is the first value (½). At (or before) the second time, a prediction is made regarding the ambient light level at the third time. In particular, a prediction is made that the ambient light level at the third time will be a third value (⅓), as shown by the gray line in the first graph 510, when it actually changes to the second value (¼), as shown by the black line in the first graph 510.

Based on the prediction that the ambient light level will decrease at the third time, the transmission coefficient is decreased between the second time and the third time from the first value (½) to a second value (⅓) less than the first value. At the third time, the transmission coefficient is increased to a third value (1). From the third time to the seventh time, the transmission coefficient is as illustrated in FIG. 5B.

FIG. 5C further illustrates a third graph 530C of the transmitted light level (T) versus time. In FIG. 5C, the transmitted light level is a first value (½) from the first time to the second time and decreases between the second time and the third time to a second value (⅓) lower than the first value. At the third time, the ambient light level is the third value (¼), not the predicted second value (⅓). Accordingly, at the third time, the transmitted light level abruptly drops from the second value (⅓) to a third value (¼). From the third time to the seventh time, the transmitted light level is as illustrated in FIG. 5B.

Thus, the change in transmitted light level caused by the change in ambient light level at the third time is partially spread out over the period between the second time and the third time. Although there is an abrupt change in the transmitted light level at the third time, it is not as severe as the change in transmitted light level in, e.g., FIG. 5A. Accordingly, between the second time and the third time, the user's eyes can at least partially adapt to the change in transmitted light level before it reaches is minimum. In other words, changing the transmission coefficient between the second time and the third time triggers dark adaptation of the user.

Figure 5D:
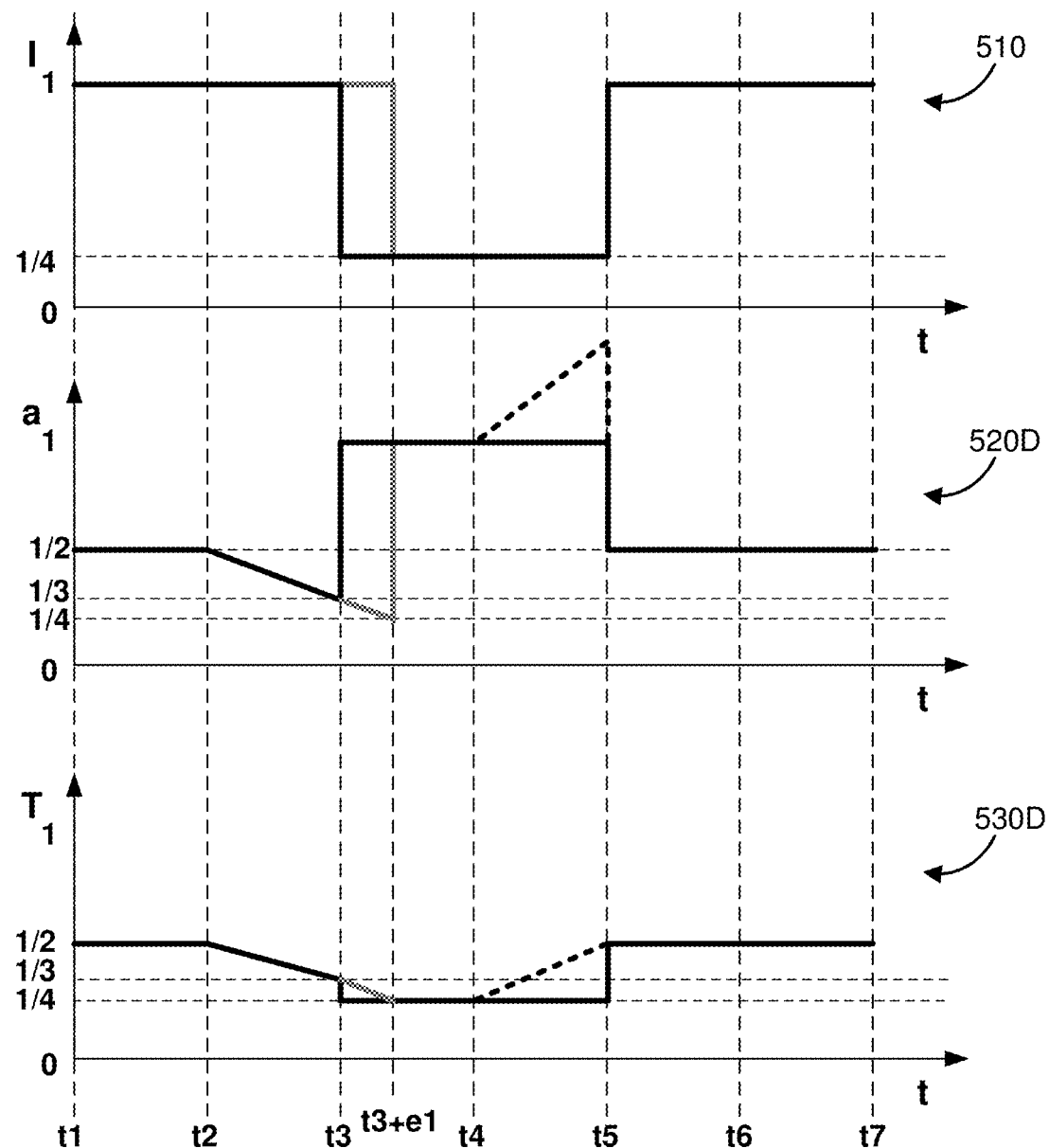

FIG. 5D illustrates graphs of an ambient light level, a transmission coefficient, and a transmitted light level in a fourth implementation of controlling a dimming level of a dimmable optical element through changes in ambient light level of a second degree. FIG. 5D illustrates the first graph 510 of the ambient light (I) versus time (t) of FIG. 5A.

FIG. 5D further illustrates a second graph 520D of the transmission coefficient (a) versus time in accordance with various implementations. In FIG. 5D, the transmission coefficient is based on the current ambient light level and an incorrect prediction of the ambient light level at a future time. Between the first time and the second time, the transmission coefficient is the first value (½). At (or before) the second time, a prediction is made regarding the ambient light level at an incorrect third time (t3+e1) after the third time. In particular, a prediction is made that the ambient light level at the incorrect third time will be a second value (¼), as shown by the gray line in the first graph 510, when it actually changes to the second value at the third time, as shown by the black line in the first graph 510.

Based on the prediction that the ambient light level will decrease at the incorrect third time, the transmission coefficient is decreased between the second time and the third time from the first value (½) to a second value (⅓) less than the first value, as shown by the black line in the second graph 520D, but more than a third value (¼) that would be reached if the prediction timing were correct, as shown by the gray line in the second graph 520D. At the third time, the transmission coefficient is increased to a fourth value (1) based on detection of the change in ambient light level. From the third time to the seventh time, the transmission coefficient is as illustrated in FIG. 5B.

FIG. 5D further illustrates a third graph 530D of the transmitted light level (T) versus time. In FIG. 5D, the transmitted light level is a first value (½) from the first time to the second time and decreases between the second time and the third time to a second value (⅓) lower than the first value but more than a third value (¼) that would be reached if the prediction timing were correct. At the third time, the transmitted light level abruptly drops from the second value (⅓) to the third value (¼). From the third time to the seventh time, the transmitted light level is as illustrated in FIG. 5B.

Thus, the change in transmitted light level caused by the change in ambient light level at the third time is partially spread out over the period between the second time and the third time. Although there is an abrupt change in the transmitted light level at the third time, it is not as severe as the change in transmitted light level in, e.g., FIG. 5A. Accordingly, between the second time and the third time, the user's eyes can at least partially adapt to the change in transmitted light level before it reaches is minimum. In other words, changing the transmission coefficient between the second time and the third time triggers dark adaptation of the user.

Figure 5E:
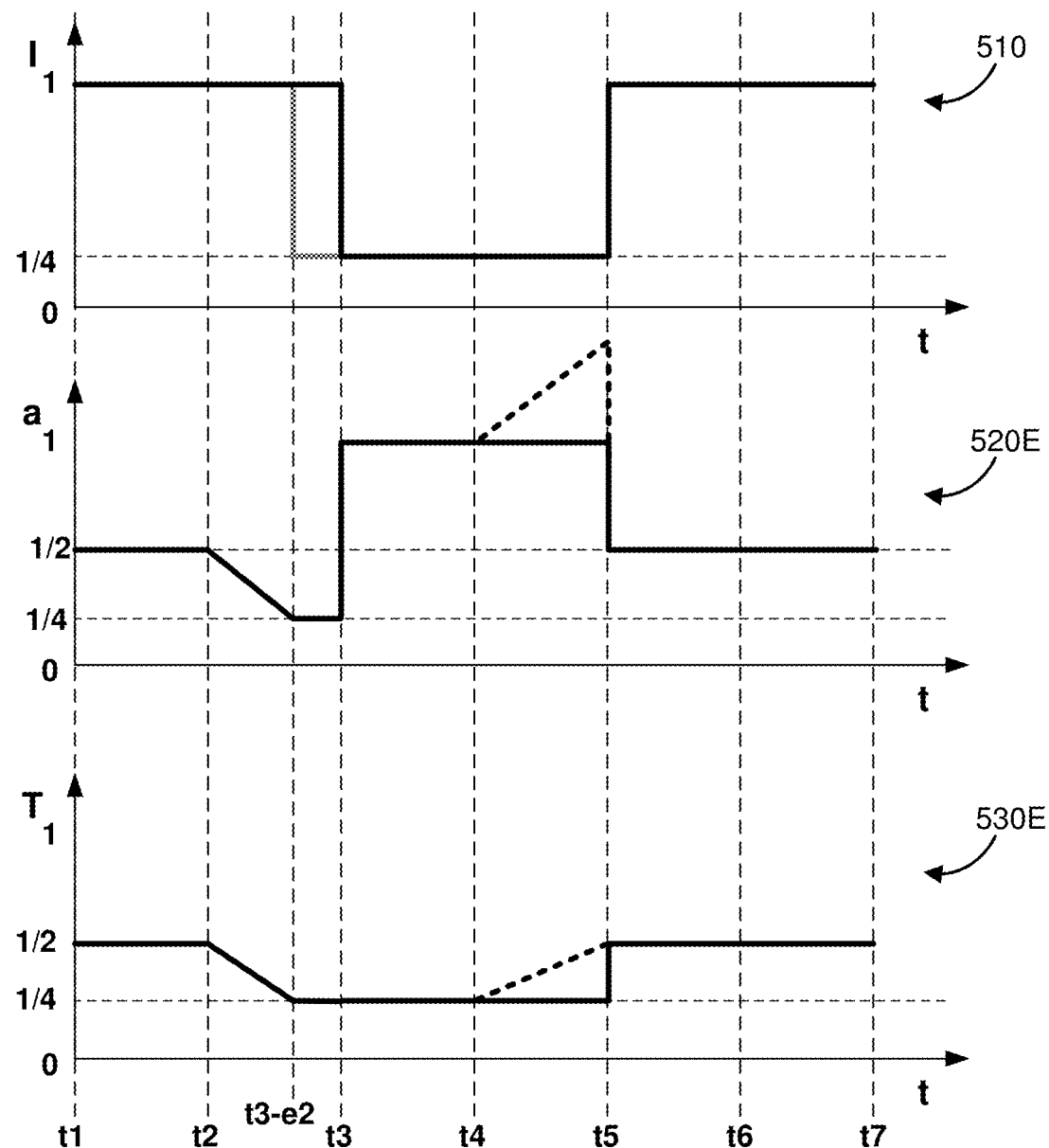

FIG. 5E illustrates graphs of an ambient light level, a transmission coefficient, and a transmitted light level in a fifth implementation of controlling a dimming level of a dimmable optical element through changes in ambient light level of a second degree. FIG. 5E illustrates the first graph 510 of the ambient light (I) versus time (t) of FIG. 5A.

FIG. 5E further illustrates a second graph 520E of the transmission coefficient (a) versus time in accordance with various implementations. In FIG. 5E, the transmission coefficient is based on the current ambient light level and an incorrect prediction of the ambient light level at a future time. Between the first time and the second time, the transmission coefficient is the first value (½). At (or before) the second time, a prediction is made regarding the ambient light level at an incorrect third time (t3-e2) before the third time. In particular, a prediction is made that the ambient light level at the incorrect third time will be a second value (¼), as shown by the gray line in the first graph 510, when it actually changes to the second value at the third time, as shown by the black line in the first graph 510.

Based on the prediction that the ambient light level will decrease at the incorrect third time, the transmission coefficient is decreased between the second time and the incorrect third time from the first value (½) to a second value (¼). Between the incorrect third time and third time, the transmission coefficient is maintained at the second value. At the third time, the transmission coefficient is increased to a third value (1) based on detection of the change in ambient light level. From the third time to the seventh time, the transmission coefficient is as illustrated in FIG. 5B.

FIG. 5E further illustrates a third graph 530E of the transmitted light level (T) versus time. In FIG. 5E, the transmitted light level is a first value (½) from the first time to the second time and decreases between the second time and the incorrect third time to a second value (¼) lower than the first value. Between the incorrect third time and the third time, the transmitted light level remains the second value (¼). From the third time to the seventh time, the transmitted light level is as illustrated in FIG. 5B.

Thus, the change in transmitted light level caused by the change in ambient light level at the third time is partially spread out over the period between the second time and the incorrect third time and is not an abrupt change. Accordingly, between the second time and the incorrect third time, the user's eyes can at least partially adapt to the change in transmitted light level before it reaches is minimum. In other words, changing the transmission coefficient between the second time and the third time triggers dark adaptation of the user.

Figure 5F:
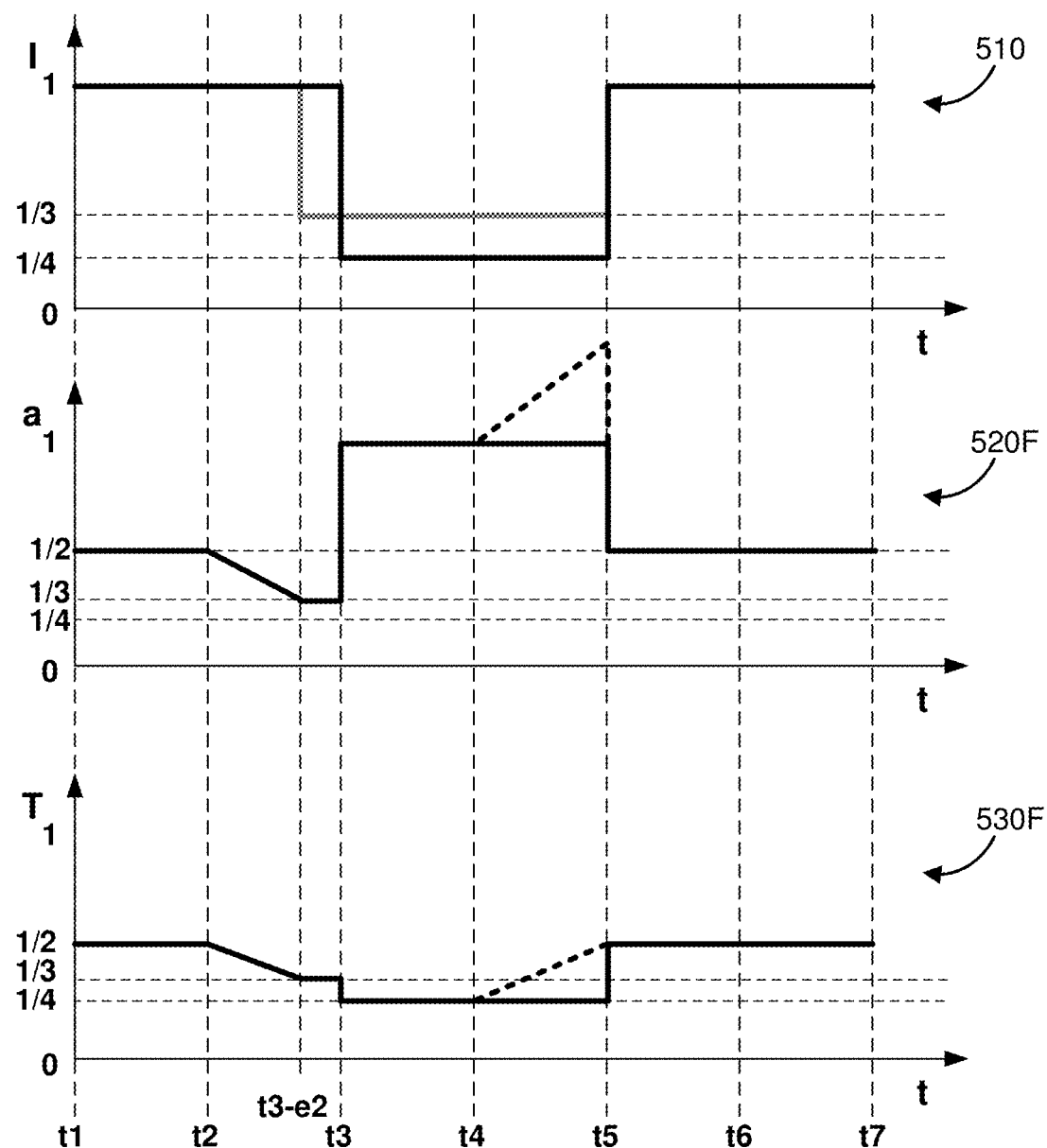

FIG. 5F illustrates graphs of an ambient light level, a transmission coefficient, and a transmitted light level in a sixth implementation of controlling a dimming level of a dimmable optical element through changes in ambient light level of a second degree. FIG. 5F illustrates the first graph 510 of the ambient light (I) versus time (t) of FIG. 5A.

FIG. 5F further illustrates a second graph 520F of the transmission coefficient (α) versus time in accordance with various implementations. In FIG. 5F, the transmission coefficient is based on the current ambient light level and an incorrect prediction of the ambient light level at a future time. Between the first time and the second time, the transmission coefficient is the first value (½). At (or before) the second time, a prediction is made regarding the ambient light level at an incorrect third time (t3-e2). In particular, a prediction is made that the ambient light level at the incorrect third time will be a third value (⅓), as shown by the gray line in the first graph 510, when it actually changes to the second value (¼) at the third time, as shown by the black line in the first graph 510.

Based on the prediction that the ambient light level will decrease at the incorrect third time, the transmission coefficient is decreased between the second time and the incorrect third time from the first value (½) to a second value (⅓) less than the first value. Between the incorrect third time and the third time, the transmission coefficient is maintained at the second value. At the third time based on detection of the change in ambient light level, the transmission coefficient is increased to a third value (1). From the third time to the seventh time, the transmission coefficient is as illustrated in FIG. 5B.

FIG. 5F further illustrates a third graph 530F of the transmitted light level (T) versus time. In FIG. 5F, the transmitted light level is a first value (½) from the first time to the second time and decreases between the second time and the incorrect third time to a second value (⅓) lower than the first value. Between the incorrect third time and the third time, the transmitted light level remains the second value. At the third time, the ambient light level is the third value (¼), not the predicted second value (⅓). Accordingly, at the third time, the transmitted light level abruptly drops from the second value (⅓) to a third value (¼). From the third time to the seventh time, the transmitted light level is as illustrated in FIG. 5B.

Thus, the change in transmitted light level caused by the change in ambient light level at the third time is partially spread out over the period between the second time and the incorrect third time. Although there is an abrupt change in the transmitted light level at the third time, it is not as severe as the change in transmitted light level in, e.g., FIG. 5A. Accordingly, between the second time and the incorrect third time, the user's eyes can at least partially adapt to the change in transmitted light level before it reaches is minimum. In other words, changing the transmission coefficient between the second time and the incorrect third time triggers dark adaptation of the user.

FIG. 6 is a flowchart representation of a method 600 of controlling a dimming level of a dimmable optical element based on a predicted change in ambient light level in accordance with some implementations. In various implementations, the dimmable optical element is an optical passthrough display, e.g., including a globally dimmable layer. In various implementations, the method 600 is performed by a device with one or more processors, non-transitory memory, and a dimmable optical element (e.g., the HMD 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device predicting a change, in a first direction, in ambient light level at a future time. In various implementations, the prediction is based on a predicted location of the device at the future time. In various implementations, the predicted location is based on a current location, current speed, and/or current direction of the device. In various implementations, the predicted location is associated with a known ambient light level. Thus, in various implementations, the device predicts the change in ambient light level based on a current ambient light level and an ambient light level associated with a predicted location of the device at the future time. For example, in various implementations, the device predicts a change in ambient light level when a user of the device is approaching a tunnel, the entrance to a building, or a street corner.

In various implementations, the device includes an outward-facing camera or scene camera and the prediction is based on one or more images captured by the scene camera. For example, in various implementations, the device predicts a change in ambient light level when the images show that a user of the device is reaching for a doorknob or approaching a shadow. In various implementations, the device includes an ambient light sensor and the prediction is based on ambient light levels detected by the ambient light sensor. For example, in various implementations, the device predicts a change in ambient light level when the ambient light level has been slowly dropping (e.g., indicating that the sun is setting or rising).

In various implementations, the prediction is based on learned behavior associated with particular times. For example, in various implementations, the device predicts a change in ambient light level by learning that office blinds automatically close at 5:00 pm everyday.

In various implementations, the prediction is based on cloud data retrieved over a network. For example, in various implementations, the device predicts a change in ambient light level based on data indicating that streetlights turn on at civil twilight (a time retrieved via the network) or that a solar eclipse is expected to occur (at a time retrieved via the network). In various implementations, the prediction is based on sunrise/sunset data (e.g., at times retrieved via the network). In various implementations, the prediction is based on predicted weather. In various implementations, the prediction is based on calendar entries (e.g., generated by a user).

In various implementations, the device predicts a change, in a negative direction, of the ambient light level at the future time. Thus, the device predicts that the ambient light level will decrease at the future time. In various implementations, the device predicts a change, in a positive direction, of the ambient light level at the future time. Thus, the device predicts that the ambient light level will increase at the future time. For example, in FIG. 4D, the device predicts a decrease in the ambient light level at the third time and predicts an increase in the ambient light level at the fifth time.

The method 600 continues, in block 620, with the device, at a first time in advance of the future time, changing, in the first direction, a transmission coefficient of the dimmable optical element based on the predicted change in the ambient light level.

In various implementations, the device predicts a decrease in the ambient light level at the future time and, in advance of the future time, controls a dimming level of the dimmable optical element to decrease the transmission coefficient of the dimmable optical element. For example, in FIG. 4D, the device decreases the transmission coefficient of the dimmable optical element between the second time and the third time. As another example, in FIG. 5F, the device the transmission coefficient of the dimmable optical element between the second time and the incorrect third time.

In various implementations, the device predicts an increase in the ambient light level at the future time and, in advance of the future time, controls a dimming level of the dimmable optical element to increase the transmission coefficient of the dimmable optical element. For example, in FIG. 4D, the device increases the transmission coefficient of the dimmable optical element between the fourth time and fifth time.

In various implementations, increasing the transmission coefficient of the dimmable optical element includes anti-dimming. Thus, in various implementations, increasing the transmission coefficient of the dimmable optical element includes emitting light from a light emitting layer of an optical passthrough display including the dimmable optical element. For example, in FIG. 5B, the device increases the transmission coefficient of the dimmable optical element between the fourth time and the fifth time through anti-dimming.

In various implementations, changing, in the first direction, the transmission coefficient of the dimmable optical element includes gradually changing, in the first direction, the transmission coefficient of the dimmable optical element from the first time until the future time. For example, in FIG. 5E, the transmission coefficient is gradually decreased between the second time and the incorrect third time.

In various implementations, changing, in the first direction, the transmission coefficient of the dimmable optical element includes gradually changing, in the first direction, the transmission coefficient of the dimmable optical element from the first time until a second time, e.g., a second time at which the predicted change in ambient light levels is detected. For example, in FIG. 5C and FIG. 5D, the transmission coefficient is gradually decreased between the second time and the third time.

The method 600 continues, at block 630, with the device, at a second time after the first time, changing, in a second direction opposite the first direction, the transmission coefficient of the dimmable optical element based on the ambient light level at the second time. In various implementations, the second time is the future time. For example, in FIG. 5B, the transmission coefficient is increased at the third time. In various implementations, the second time is before the future time. For example, in FIG. 5D, the transmission coefficient is increased at the third time before the incorrect third time. In various implementations, the second time is after the future time. For example, in FIG. 5E, the transmission coefficient is increased at the third time before the incorrect third time.

In various implementations, the device predicts a decrease in the ambient light level at the future time and, at the first time, controls a dimming level of the dimmable optical element to decrease the transmission coefficient of the dimmable optical element and, at the second time, increases the transmission coefficient of the dimmable optical element. For example, in FIG. 5B, between the second time and the third time, the device decreases the transmission coefficient of the dimmable optical element and, at the third time, the device increases the transmission coefficient of the dimmable optical element. As another example, in FIG. 5E, between the second time and the incorrect third time, the device decreases the transmission coefficient of the dimmable optical element and, at the third time, the device increases the transmission coefficient of the dimmable optical element.

In various implementations, the device predicts an increase in the ambient light level at the future time and, at the first time, controls a dimming level of the dimmable optical element to increase the transmission coefficient of the dimmable optical element and, at the second time, decreases the transmission coefficient of the dimmable optical element. For example, in FIG. 5B, at the fifth time, the device decreases the transmission coefficient of the dimmable optical element.

Thus, in various implementations, the device triggers dark adaptation of a user the device before ambient light levels decrease (or light adaptation of the user before ambient light levels increase). In various implementations, changing the transmission coefficient in advance of the future time includes changing the transmission coefficient depending on adaptation properties of the human visual system (e.g., how long it takes the photoreceptors adapt to the new situation) and, in particular, to adaptation properties of the user based on individual biometric data.

In various implementations, the device includes the dimmable optical element positioned in front of a first eye of a user and a second dimmable optical element positioned in front of a second eye of the user. In various implementations, the device changes the dimming coefficient of the two dimmable optical elements the same or differently.

For example, in various implementations, while changing, at the first time and in the first direction, the transmission coefficient of the dimmable optical element and changing, at the second time and in the second direction, the transmission coefficient of the dimmable optical element, the device also changes, at the first time and in the first direction, the transmission coefficient of the second dimmable optical element and changes, at the second time and in the second direction, the transmission coefficient of the second dimmable optical element. Thus, in various implementations, dark adaptation is triggered for both eyes of a user before the user enters a darker area. However, by dimming the dimmable optical elements before the user enters the darker area and while the user is in a lighter area, the user's vision is partially hindered.

As another example, in various implementations, while changing, at the first time and in the first direction, the transmission coefficient of the dimmable optical element and changing, at the second time and in the second direction, the transmission coefficient of the dimmable optical element, the device forgoes changing the transmission coefficient of the second dimmable optical element in advance of the second time, but changes the transmission coefficient of the second dimmable element at the second time. Thus, in various implementations, dark adaptation is triggered for one eye of a user before the user enters a darker area, but vision is not hindered as transmission to the other eye is not dimmed.

In various implementations, the device, at the first time, changes, in the first direction, the transmission coefficient of the dimmable optical element by differently changing one or more spectral transmission coefficients associated with different spectral bands.

For example, in various implementations, the device changes the spectral transmission coefficient of a spectral band including rod cell absorbance (e.g., approximately 498 nm, a green-blue color) more than the device changes the spectral transmission coefficient of other spectral bands. Thus, rod cells may more quickly adapt to dark (or light) conditions.

As another example, in various implementations, the device changes the spectral transmission coefficient of a red spectral band (between approximately 625-740 nm) less than the device changes the spectral transmission coefficient of other spectral bands (or forgoes changing the spectral transmission coefficient of the red spectral band while changing the spectral transmission coefficient of the other spectral bands). Thus, in advance of the future time, the device operates as red lens glasses (or red adaptor goggles or dark adaptor goggles).

Figure 7:
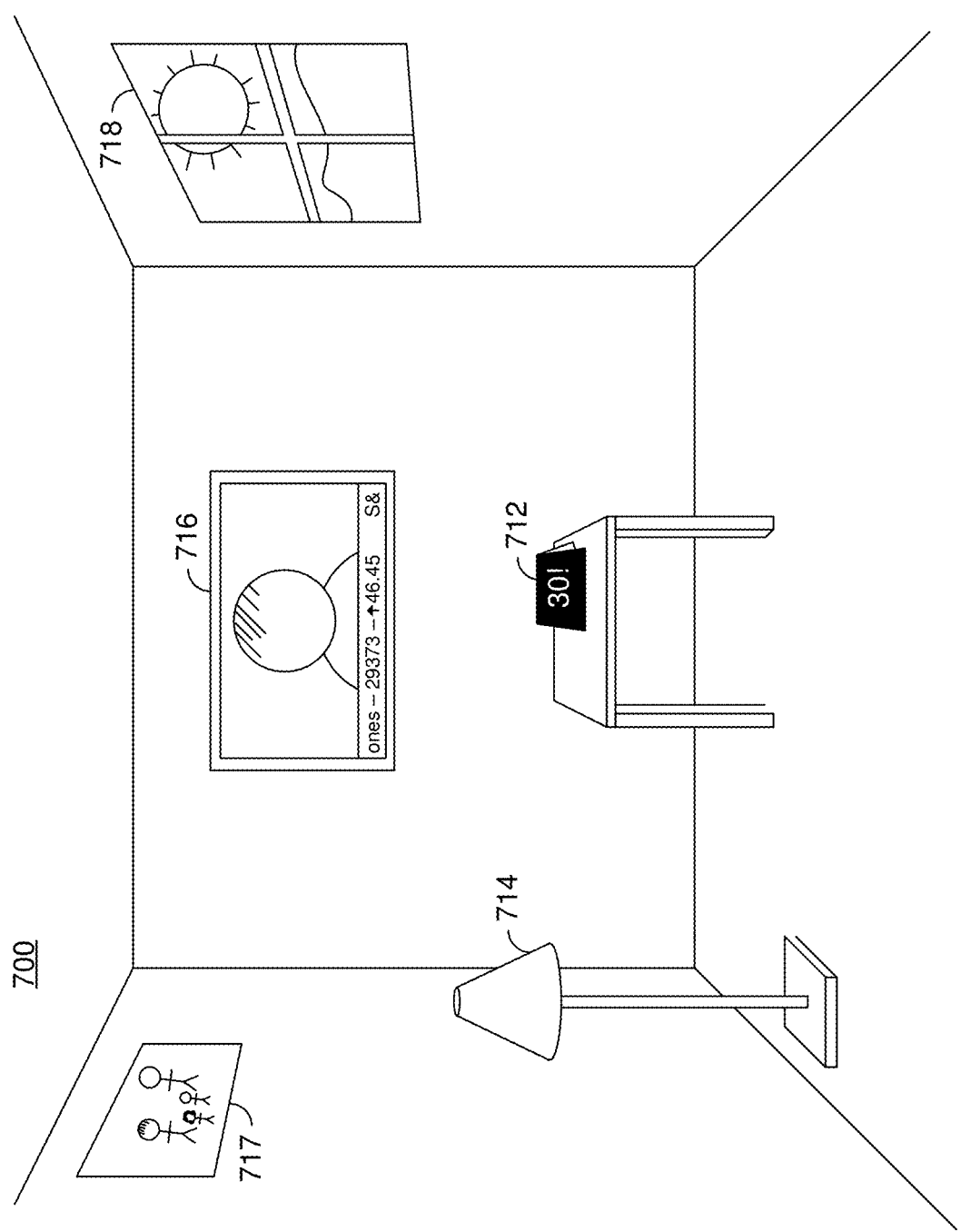
FIG. 7 illustrates a view of a scene in accordance with some implementations.

FIG. 7 illustrates a scene 700 including a black birthday card 712, a lamp 714, a television 716, a photograph 717, and a window 718. As noted above, in various implementations, the dimming level of a dimmable optical element is set by an ambient light level. In various implementations, the dimming level is adjusted based on an eye measurement, such as a gaze direction.

For example, in various implementations, a first dimming level is selected based on the ambient light level. For example, based on the ambient light level of the scene 700 (e.g., from the lamp 714, the television 716, and the sunlight through the window 718), a first dimming level is selected corresponding to a first transmission coefficient. Further, in various implementations, actions are taken based on a gaze direction of the user, e.g., what the user is looking at.

For example, if the transmission coefficient is unchanged while the user is looking at the black birthday card 712, the user may find the black birthday card 712 difficult to read. Accordingly, in various implementations, while the user is looking at the black birthday card 712, the dimming level is changed to increase the transmission coefficient, allowing easier reading of the black birthday card 712.

As another example, if the transmission coefficient is unchanged while the user is looking at the television 716, the light emitted by the television 716 would be absorbed by the dimming optical element resulting in a waste of power. Accordingly, in various implementations, while the user is looking at the television 716, the dimming level is changed to increase the transmission coefficient, reducing absorption by the dimming optical element. Further, in various implementations, the brightness of the television 716 (e.g., the amount of light emitted by the television 716) is reduced based on the dimming level of dimmable optical element.

Although FIG. 7 illustrates a television 716 including a screen that emits light, in various implementations, the television is replaced with another device including a screen that emits light, such as a laptop, tablet, or smart phone.

As another example, if the transmission coefficient is unchanged while the user is looking out the window 718 as compared to while the user is looking at the photograph 717, the user may experience discomfort due to eye strain resulting from adjusting to apparent light levels. Accordingly, in various implementations, the dimming level is changed to decrease the transmission coefficient while the user is looking at a bright object.

As noted above, in various implementations, the dimming level of the dimmable optical element is adjusted based on the ambient light level and other factors (e.g., the gaze direction). Further, in various implementations, as an alternative or in addition to adjusting the dimming level, the ambient light level itself is adjusted, e.g., by controlling the amount of light emitting by the lamp 714.

In addition or as an alternative to the gaze direction, in various implementations, other eye measurements are used in adjusting the dimming level of the dimmable optical element.

In various implementations, the dimming level is adjusted based on a pupil dilation of the user. For example, if a pupil of the user is more (or less) dilated, the transmission coefficient of the dimmable optical element is decreased (or increased) as compared to the first transmission coefficient (e.g., based on ambient light levels alone).

In various implementations, the dimming level is adjusted based on extraocular muscle contraction (e.g., whether the user is squinting or wide-eyed) of the user. For example, in various implementations, if the user is squinting, the transmission coefficient of the dimmable optical element is increased, e.g., allowing a user to more easily read the black birthday card 712. As another example, in various implementations, if the user is squinting, the transmission coefficient of the dimmable optical element is decreased, e.g., reducing eye strain when viewing a bright object, such as the sun outside the window 718. As another example, in various implementations, if the user is wide-eyed, the transmission coefficient of the dimmable optical element is decreased, e.g., allowing a user to more easily view the photograph 717.

In various implementations, the dimming level is adjusted based on an eyelid closure of the user. For example, in various implementations, if the user's eyes are partially closed, this may indicate weariness and the transmission coefficient is increased to promote alertness of the user.

FIG. 8 is a flowchart representation of a method 800 of controlling a dimming level of a dimmable optical element based on an eye measurement in accordance with some implementations. In various implementations, the dimmable optical element is an optical passthrough display, e.g., including a globally dimmable layer. In various implementations, the method 800 is performed by a device with one or more processors, non-transitory memory, and a dimmable optical element (e.g., the HMD 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device capturing an image of an eye of a user. In various implementations, the image of the eye of the user is captured using an eye tracking camera. In various implementations, the image (or a second image) includes a second eye of the user.

The method 800 continues, in block 820, with the device determining, based on the image of the eye of the user, an eye measurement of the user. In various implementations the eye measurement of the user is further based on a second image of a second eye of the user.

The method 800 continues, in block 830, with the device changing a transmission coefficient of the dimmable optical element based on the eye measurement. In various implementations, the device controls a dimming level of the dimmable optical element to change the transmission coefficient of the dimmable optical element.

In various implementations, changing the transmission coefficient of the dimmable optical element includes determining a base transmission coefficient based on a current ambient light level and determining an adjusted transmission coefficient based on the base transmission coefficient and the eye measurement of the user.

In various implementations, determining the eye measurement of the user (in block 820) includes determining a gaze direction of the user. In various implementations, the device further determines an object that the user is looking at (and, in particular, a brightness of the object) based on the gaze direction of the user. In various implementations, changing the transmission coefficient (in block 830) includes increasing the transmission coefficient if the user is looking at something dark (such as the black birthday card 712 of FIG. 7) or decreasing the transmission coefficient if the user is looking at something bright (such as the television 716 of FIG. 7).

In various implementations, determining the eye measurement of the user (in block 820) includes determining a pupil dilation of the user. In various implementations, changing the transmission coefficient (in block 830) includes increasing the transmission coefficient if the pupil is less dilated and decreasing the transmission coefficient if the pupil is more dilated.

In various implementations, determining the eye measurement of the user (in block 820) includes determining an extraocular muscle contraction of the user. In various implementations, the device further determines whether the user is squinting or wide-eyed based on the extraocular muscle contraction. In various implementations, changing the transmission coefficient (in block 830) includes increasing the transmission coefficient if the user is squinting in a first manner (e.g., using a first set of extraocular muscles or to a first degree), thereby, for example, allowing a user to more easily view dark objects such as black birthday card 712 of FIG. 7. In various implementations, changing the transmission coefficient (in block 830) includes decreasing the transmission coefficient if the user is squinting in a second manner (e.g., using a second set of extraocular muscles or to a second degree), thereby, for example, reducing eye strain when viewing a bright object, such as the sun outside the window 718 in FIG. 7. In various implementations, changing the transmission coefficient (in block 830) includes decreasing the transmission coefficient if the user is wide-eyed, thereby, for example, allowing a user to more easily view detailed objects, such as the photograph 717 of FIG. 7.

In various implementations, determining the eye measurement of the user (in block 820) includes determining an eyelid closure of the user. In various implementations, the device further determines an alertness level of the user based on the eyelid closure. In various implementations, changing the transmission coefficient (in block 830) includes increasing the transmission coefficient to increase the alertness level of the user.

In various implementations, in addition to (or as an alternative to) changing the transmission coefficient in block 830, the device changes the ambient light level based on the eye measurement of the user. In various implementations, in addition to (or as an alternative to) changing the transmission coefficient in block 830, the device changes the brightness level of an object the user is looking at based on the eye measurement of the user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including one or more processors, a non-transitory memory, an eye tracking camera, and a dimmable optical element,
    capturing, via the eye tracking camera, an image of an eye of a user;
    determining, based on the image of the eye of the user, an eye measurement of the user; and
    changing a transmission coefficient of the dimmable optical element based on the eye measurement of the user, including determining a base transmission coefficient of the dimmable optical element based on a current ambient light level and determining an adjusted transmission coefficient of the dimmable optical element based on the base transmission coefficient and the eye measurement of the user.

2. The method of claim 1, wherein determining the eye measurement of the user includes determining a gaze direction of the user.

3. The method of claim 2, further comprising determining a brightness level of an object the user is looking at based on the gaze direction of the user, wherein changing the transmission coefficient of the dimmable optical element is based on the brightness level of the object the user is looking at.

4. The method of claim 1, wherein determining the eye measurement of the user includes determining a pupil dilation of the user.

5. The method of claim 4, wherein changing the transmission coefficient of the dimmable optical element is based on the pupil dilation of the user.

6. The method of claim 1, wherein determining the eye measurement of the user includes determining an extraocular muscle contraction of the user.

7. The method of claim 6, further comprising determining whether the user is squinting or wide-eyed based on the extraocular muscle contraction of the user, wherein changing the transmission coefficient of the dimmable optical element is based on whether the user is squinting or wide-eyed.

8. The method of claim 1, wherein determining the eye measurement of the user includes determining an eyelid closure of the user.

9. The method of claim 8, further comprising determining an alertness level of the user based on the eyelid closure of the user, wherein changing the transmission coefficient of the dimmable optical element is based on the alertness level of the user.

10. The method of claim 1, further comprising changing an ambient light level based on the eye measurement of the user.

11. The method of claim 1, further comprising changing a brightness level of an object the user is looking at based on the eye measurement of the user.

12. A method comprising:
    at a device including one or more processors, non-transitory memory, an eye tracking camera, and a dimmable optical element:
    capturing, via the eye tracking camera, an image of an eye of a user;
    determining, based on the image of the eye of the user, an eye measurement of the user, including determining an extraocular muscle contraction of the user;
    determining whether the user is squinting or wide-eyed based on the extraocular muscle contraction of the user; and
    changing a transmission coefficient of the dimmable optical element based on the eye measurement of the user, including changing the transmission coefficient of the dimmable optical element based on whether the user is squinting or wide-eyed.

13. A method comprising:
    at a device including one or more processors, non-transitory memory, an eye tracking camera, and a dimmable optical element:
    capturing, via the eye tracking camera, an image of an eye of a user;
    determining, based on the image of the eye of the user, an eye measurement of the user, including determining an eyelid closure of the user;
    determining an alertness level of the user based on the eyelid closure of the user; and
    changing a transmission coefficient of the dimmable optical element based on the eye measurement of the user, including changing the transmission coefficient of the dimmable optical element based on the alertness level of the user.

14. A device comprising:
    an eye tracking camera;
    a dimmable optical element;
    a non-transitory memory; and
    one or more processors to:
        capture, via the eye tracking camera, an image of an eye of the user;
        determine, based on the image of the eye of the user, an eye measurement of the user; and
        change a transmission coefficient of the dimmable optical element based on the eye measurement of the user, including determining a base transmission coefficient of the dimmable optical element based on a current ambient light level and determining an adjusted transmission coefficient of the dimmable optical element based on the base transmission coefficient and the eye measurement of the user.

15. The device of claim 14, wherein the one or more processors are to determine the eye measurement of the user by determining a gaze direction of the user.

16. The device of claim 15, wherein the one or more processors are further to determine a brightness level of an object the user is looking at based on the gaze direction of the user and change the transmission coefficient of the dimmable optical element based on the brightness level of the object the user is looking at.

17. The device of claim 14, wherein the one or more processors are to determine the eye measurement of the user by determining an extraocular muscle contraction of the user, are further to determine whether the user is squinting or wide-eyed based on the extraocular muscle contraction of the user, and are to change the transmission coefficient of the dimmable optical element is based on whether the user is squinting or wide-eyed.

18. The device of claim 14, wherein the one or more processors are to determine the eye measurement of the user by determining an eyelid closure of the user, are further to determine an alertness level of the user based on the eyelid closure of the user, and are to change the transmission coefficient of the dimmable optical element based on the alertness level of the user.

19. The device of claim 14, wherein the one or more processors are further to change an ambient light level or a brightness level of an object the user is looking at based on the eye measurement of the user.

20. A non-transitory memory storing one or more programs, which, when executed by one or more processors of a device with an eye tracking camera and a dimmable optical element, cause the device to:
- capture, via the eye tracking camera, an image of an eye of the user;
- determine, based on the image of the eye of the user, an eye measurement of the user; and
- change a transmission coefficient of the dimmable optical element based on the eye measurement of the user, including determining a base transmission coefficient of the dimmable optical element based on a current ambient light level and determining an adjusted transmission coefficient of the dimmable optical element based on the base transmission coefficient and the eye measurement of the user.

\* \* \* \* \*